US012594826B2

(12) United States Patent
Byun

(10) Patent No.: US 12,594,826 B2
(45) Date of Patent: Apr. 7, 2026

(54) COOLING MODULE AND VEHICLE PROVIDED WITH AIR GUIDE

(71) Applicants: Hyundai Motor Company, Seoul (KR); Kia Corporation, Seoul (KR)

(72) Inventor: Hyung Suk Byun, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 638 days.

(21) Appl. No.: 18/148,114

(22) Filed: Dec. 29, 2022

(65) Prior Publication Data

US 2024/0001757 A1 Jan. 4, 2024

(30) Foreign Application Priority Data

Jun. 29, 2022 (KR) ........................ 10-2022-0079462

(51) Int. Cl.
| | |
|---|---|
| *B60K 11/04* | (2006.01) |
| *B60K 11/08* | (2006.01) |
| *H01M 8/04014* | (2016.01) |
| *B60L 50/70* | (2019.01) |
| *H01M 8/10* | (2016.01) |

(52) U.S. Cl.
CPC .............. *B60K 11/04* (2013.01); *B60K 11/08* (2013.01); *H01M 8/04014* (2013.01); *B60L 50/70* (2019.02); *H01M 2008/1095* (2013.01); *H01M 2250/20* (2013.01)

(58) Field of Classification Search
CPC .... B60K 11/04; B60K 11/08; H01M 8/04014; H01M 2008/1095; H01M 2250/20; B60L 50/70

USPC ........................................................ 180/65.31
See application file for complete search history.

(56) References Cited

U.S. PATENT DOCUMENTS

| | | | | |
|---|---|---|---|---|
| 7,603,968 B2 * | 10/2009 | Pantow | .................. | B60K 11/04 123/41.04 |
| 7,766,111 B2 * | 8/2010 | Guilfoyle | ............. | B60K 11/085 296/180.5 |
| 8,443,921 B2 * | 5/2013 | Charnesky | ................ | F01P 7/08 180/68.1 |
| 8,479,855 B2 * | 7/2013 | Kim | ....................... | B60K 11/02 62/239 |
| 8,535,104 B1 * | 9/2013 | Nida | .................... | B63H 21/383 62/3.61 |

(Continued)

FOREIGN PATENT DOCUMENTS

| | | |
|---|---|---|
| JP | 2003035224 A | 2/2003 |
| JP | 2003072394 A | 3/2003 |

(Continued)

*Primary Examiner* — James A Shriver, II
*Assistant Examiner* — Hilary L Johns
(74) *Attorney, Agent, or Firm* — Slater Matsil, LLP

(57) ABSTRACT

An embodiment vehicle includes a vehicle body and an air guide disposed in a space between a radiator grille and a cooling module in a front end portion of the vehicle body, the air guide being configured to guide air introduced through the radiator grille to flow to a radiator of the cooling module, wherein the air guide includes a first guide member fixed to a grille side structure of a front surface portion of the vehicle in which the radiator grille is positioned in the front end portion of the vehicle body and a second guide member installed in a cooling module side structure and spaced apart from the first guide member at an interval.

21 Claims, 14 Drawing Sheets

(56)                 References Cited

U.S. PATENT DOCUMENTS

| | | | | |
|---|---|---|---|---|
| 8,708,075 | B2 * | 4/2014 | Maurer | B60K 11/08 |
| | | | | 180/68.1 |
| 8,936,121 | B2 * | 1/2015 | Vacca | B60K 11/04 |
| | | | | 165/44 |
| 9,147,917 | B2 * | 9/2015 | Oh | H01M 10/6563 |
| 9,840,144 | B2 * | 12/2017 | Aizawa | B60R 19/023 |
| 9,969,342 | B2 * | 5/2018 | Klop | B60R 19/52 |
| 9,988,969 | B2 * | 6/2018 | Dziubinschi | F01P 11/10 |
| 10,047,496 | B2 * | 8/2018 | Yamashita | E02F 9/16 |
| 10,584,465 | B2 * | 3/2020 | Sakon | B60K 11/02 |
| 10,704,456 | B2 * | 7/2020 | Dziubinschi | F01P 11/10 |
| 10,857,872 | B2 * | 12/2020 | Sedlak | B60K 11/085 |
| 2005/0257563 | A1 | 11/2005 | Hoshi et al. | |
| 2008/0196436 | A1 | 8/2008 | Connell et al. | |
| 2012/0022742 | A1 * | 1/2012 | Nemoto | B60K 11/085 |
| | | | | 701/36 |
| 2012/0085510 | A1 * | 4/2012 | Kim | B60K 11/04 |
| | | | | 165/44 |
| 2012/0111652 | A1 * | 5/2012 | Charnesky | F01P 7/10 |
| | | | | 180/68.1 |
| 2013/0046445 | A1 * | 2/2013 | Nishimura | B60K 11/085 |
| | | | | 701/49 |
| 2013/0092462 | A1 * | 4/2013 | Chinta | B60K 11/08 |
| | | | | 180/68.1 |
| 2016/0280168 | A1 * | 9/2016 | Klop | B60R 19/48 |
| 2017/0260714 | A1 * | 9/2017 | Yamashita | E02F 9/16 |
| 2020/0130499 | A1 | 4/2020 | Jeong | |

FOREIGN PATENT DOCUMENTS

| | | |
|---|---|---|
| JP | 2003276534 A | 10/2003 |
| JP | 2005219531 A | 8/2005 |
| JP | 2005329818 A | 12/2005 |
| JP | 2010208482 A | 9/2010 |
| JP | 2012149633 A | 8/2012 |
| JP | 2014053279 A | 3/2014 |
| JP | 2014234097 A | 12/2014 |
| JP | 2015116888 A | 6/2015 |
| JP | 2022038268 A | 3/2022 |
| KR | 20130058453 A | 6/2013 |
| KR | 101538172 B1 | 7/2015 |
| KR | 20150078466 A | 7/2015 |
| KR | 20180067118 A | 6/2018 |

* cited by examiner

8

9

144

12

10

11

123

121

122

7

6

AIR

125

16

17

**VEHICLE BODY
OR BUMPER**

100

─○──○──○── : AIR FLAP DEVICE CLOSED WHEN DRIVING AT A HIGH SPEED

╱ ╱ ╱ : AIR FLAP DEVICE OPENED WHEN DRIVING AT A LOW SPEED

17

16a

16

-- Prior Art --

(CROSS SECTIONAL VIEW TAKEN ALONG A-A)

COOLING MODULE AND VEHICLE PROVIDED WITH AIR GUIDE

CROSS-REFERENCE TO RELATED APPLICATIONS

This application claims the benefit of Korean Patent Application No. 10-2022-0079462, filed on Jun. 29, 2022, which application is hereby incorporated herein by reference.

TECHNICAL FIELD

The present disclosure relates to a cooling module and a vehicle provided with an air guide.

BACKGROUND

A fuel cell electric vehicle (FCEV), which is a vehicle driven by an electric motor like a battery electric vehicle (BEV), is a vehicle that uses a fuel cell as a main power source for supplying driving power to the electric motor which is a vehicle driving source and a high-voltage battery as an auxiliary power source.

The fuel cell, which is the main power source in the fuel cell electric vehicle, is a kind of generator that converts chemical energy of fuel into electrical energy by electro-chemically reacting a fuel gas and an oxidant gas.

As a fuel cell for a vehicle, a polymer electrolyte membrane fuel cell (PEMFC) having a high power density is the most used. The polymer electrolyte membrane fuel cell uses hydrogen as a fuel gas and oxygen and air containing oxygen as an oxidant gas among reaction gases.

The fuel cell includes a plurality of cells that generate electric energy by reacting a fuel gas with an oxidant gas and is generally used in the form of a stack in which cells, which individually generate electricity, are stacked and connected to each other in series to meet the required output level.

As a fuel cell mounted on a vehicle also requires high output, the fuel cell meets the requirements by stacking hundreds of cells, which individually generate electrical energy, in the form of a stack. As described above, a cell assembly in which a plurality of cells are stacked and connected to each other is referred to as a fuel cell stack.

A fuel cell system mounted on a fuel cell electric vehicle is configured to include a fuel cell stack, a device for supplying a reaction gas to the fuel cell stack, and devices for managing a state of the fuel cell stack.

Specifically, the fuel cell system includes a fuel cell stack that generates electric energy from an electrochemical reaction of a reaction gas, a hydrogen supply device that supplies hydrogen, which is a fuel gas, to the fuel cell stack, an air supply device that supplies air containing oxygen, which is an oxidant gas, to the fuel cell stack, a heat and water management system that controls an operating temperature of the fuel cell stack and performs a heat and water management function, and a fuel cell control unit (FCU) that controls an overall operation of fuel cell system.

In addition, a power net system of a fuel cell electric vehicle includes a fuel cell stack that becomes a main power source for the vehicle, a high-voltage battery that serves as an auxiliary power source for the vehicle, a converter (bidirectional high voltage DC-DC converter (BHDC)) connected to a battery to enable output control of the battery, an inverter that is connected to a DC link terminal (main bus terminal) that is an output side of the battery and the fuel cell stack, and a driving motor connected to the inverter.

Meanwhile, as a measure to overcome a problem of battery capacity in large electric vehicles such as a truck and a bus, a hydrogen electric truck or a hydrogen electric bus equipped with a fuel cell is actively being developed.

Commercial fuel cell electric vehicles such as the hydrogen electric truck is equipped with a power plant in which fuel cell systems (hereinafter referred to as a "power module complete (PMC)") applied to passenger fuel cell electric vehicles are configured in parallel. That is, a plurality of PMCs are mounted on the commercial fuel cell electric vehicle. In this case, each PMC includes a fuel cell stack, a stack driving device, and components of a water cooling system for cooling the fuel cell stack.

Here, the components of the cooling system in the PMC include an electric water pump and valves, and are components excluding a radiator. A radiator for cooling a fuel cell stack, which radiates heat from the coolant cooling the fuel cell stack, is separately disposed on a front end portion of a vehicle body together with a cooling fan, and the radiator for cooling the fuel cell stack and components of the cooling system in the plurality of PMCs are connected to each other via a coolant line (pipe) so that the coolant may be circulated.

In the case of the hydrogen electric truck, two fuel cell stacks, which are applied to passenger fuel cell electric vehicles, may be mounted to secure vehicle driving output. In this time, the cooling systems in each PMC may be connected to each other in series to one radiator via the coolant line (pipe), and the cooling systems of the two PMCs to the radiator may be connected to each other in parallel via the coolant line.

In addition, when a plurality of high-output fuel cell stacks are mounted on a hydrogen electric truck, a heating value generated by the fuel cell stack is greatly increased, so cooling performance may be satisfied only by increasing the number of cooling modules including the radiator and the cooling fan in the front end portion of the vehicle body. However, it is difficult to secure a sufficient space for installing a plurality of cooling modules in a vehicle in consideration of an interior space, arrangement of peripheral parts (steering device, lamp, step, etc.), and the like on vehicle package.

Accordingly, it is required to optimize a flow of cooling air passing through the radiator in order to improve the cooling performance. For example, a structure that is capable of minimizing the amount of air that is re-introduced into the radiator by passing through the radiator and the cooling fan and then flowing back forward.

In addition, a structure capable of minimizing the amount of air that bypasses without passing through the radiator in the front end portion of the vehicle body while maximizing an inflow rate of fresh air that passes through a radiator grille of the front end portion of the vehicle body and then is directed to the radiator, an improved structure capable of minimizing air flow resistance in the front end portion of the vehicle body, and the like are required.

In the case of the hydrogen electric trucks that are currently being mass-produced, looking at 3D computational fluid dynamics (CFD) analysis results of air-side system resistance of the front end portion of the vehicle body and the cooling module, the radiator grille and cooling module parts excluding the radiator and cooling fan, excellent results are shown in a quantitative analysis index of air resistance according to the arrangement of the radiator grille and the components of the cooling module except for the radiator and cooling fan.

However, in the case of a next-generation hydrogen electric truck that will be equipped with a high output stack, since a heat radiation amount of a fuel cell stack is much larger than that of the current mass-produced vehicle, it is necessary to further improve the air-side system resistance and increase the cooling performance accordingly. To this end, it is required to optimize an air flow path by improving the structures of the front and rear of the cooling module.

Hereinafter, the conventional problems will be described in more detail.

In the water cooling system of the hydrogen electric truck, the radiator and the cooling fan constituting the cooling module may be mounted on the front end portion of the vehicle body. Specifically, in the hydrogen electric truck, a stack radiator and a power electronic (PE) component radiator may be mounted on the front end portion of the vehicle body, and the cooling fan may be mounted behind the radiator.

The stack radiator is a radiator for heat radiation of the coolant that has cooled the fuel cell stack, and the PE component radiator is a radiator for heat dissipation of the coolant that has cooled PE components. Here, the PE component may be a motor that is a vehicle driving source, an inverter for driving the motor, and the like.

The front end portion of the vehicle body in the hydrogen electric truck is provided with a radiator grille as an air inlet through which air (external air) may be introduced from the front, and air introduced through the radiator grille passes through the radiator and the cooling fan in turn.

In the conventional hydrogen electric truck, the air introduced through the radiator grille of the front end portion of the vehicle body needs to pass through the radiator and the cooling fan and then flow to the rear, but there is problem in that some of the air does not flow to the rear after passing through the radiator and cooling fan, and thus, collides with the components behind the cooling fan to flow back.

However, a hydraulically driven cooling fan is used as the cooling fan for the large commercial fuel vehicle such as the hydrogen electric truck. In the case of the hydraulically driven cooling fan, complex piping such as multiple oil hoses along with a hydraulic motor, an oil tank, an oil cooler, and the like are required.

Accordingly, in the vehicle to which the hydraulically driven cooling fan is applied, the complex oil hose is usually disposed behind the cooling fan along with the oil tank and the oil cooler, so the hydraulically driven cooling fan components block the flow of air behind the cooling fan. As a result, the hot air that has received the heat from the coolant in the radiator while passing through the radiator collides with the piping such as the oil hose behind the cooling fan and then flows back.

For example, when the oil tank is positioned in a left area of the rear of the cooling fan in the front end portion of the vehicle body along with the oil hose, a large amount of air passing through the radiator and the cooling fan may collide with the oil hose and the oil tank in the left area behind the cooling fan to flow back.

The hot air flowing back in this way moves to the front of the radiator and then is re-circulated to pass through the radiator again, which causes a problem in that the cooling performance of the radiator is deteriorated.

In addition, in the conventional hydrogen electric truck, a lower portion of the cooling fan and a cross member of the vehicle body are disposed to be positioned in front and rear, and an undercover is positioned under the rear of the cross member. As described above, the cross member and the undercover disposed close to the rear of the cooling fan serve as an air resistor that blocks the flow of air of the rear of the cooling fan, which reduces an absolute amount of air flowing into the radiator.

In addition, since a lower end portion of the vehicle body in front of the radiator is open in the conventional hydrogen electric truck, when the vehicle is traveling at high speed, cold air is not introduced into the radiator and flows into an opened space at the lower end portion of the vehicle body to bypass the radiator. As such, some of the air bypasses the radiator, which is a factor of the deterioration in the cooling performance.

In addition, in the stack cooling system of the hydrogen electric truck, there is an empty space between the radiator grille and the radiator in front of the cooling module. The air introduced through the air inlet (radiator grille, separate opening, or the like) of the front end portion of the vehicle body bypasses through the empty space between the vehicle body and the radiator during the high-speed driving and may not pass through the radiator, which is a factor of the deterioration in the cooling performance.

In this case, even if the cooling fan operates to decrease the amount of bypassing air and increase the amount of fresh air passing through the radiator, since there is no separate guide between the radiator and the vehicle body, as described above, the hot air passing through the radiator and the cooling fan flows back forward by colliding with the oil tank or the oil piping behind the cooling fan and then passes through the radiator again.

In addition, even when the vehicle is driving at low speed, in the state in which there is no separate guide between the radiator and the vehicle body, the phenomenon that the hot air passing through the radiator and the cooling fan collides with the resistor behind the cooling module and flows back forward of the radiator again appears to increase the air temperature in front of the radiator, which is a factor of the deterioration in the cooling performance. When the cooling performance of the radiator is insufficient, a separate auxiliary radiator may be additionally required.

SUMMARY

The present disclosure relates to a cooling module and a vehicle provided with an air guide. Particular embodiments relate to a vehicle provided with an air guide capable of optimizing a flow of air that is introduced through a radiator grill, which is an air inlet in a front end portion of a vehicle body, and then passes through a radiator and a cooling fan of a cooling module.

An embodiment of the present disclosure provides a structure capable of optimizing a flow of air that is introduced through a radiator grille in a front end portion of a vehicle body and then passes through a radiator and a cooling fan of a cooling module.

In particular, an embodiment of the present disclosure provides a structure capable of minimizing the amount of air that bypasses without passing through a radiator in a front end portion of a vehicle body while maximizing an inflow rate of fresh air that is introduced through a radiator grille and then directed to the radiator, a structure capable of minimizing the amount of air re-introduced into the radiator by passing through the radiator and a cooling fan and then flowing back forward, and an improved structure capable of minimizing air flow resistance in the front end portion of the vehicle body.

The embodiments of the present disclosure are not limited to the embodiments mentioned above, and other embodiments not mentioned could be clearly understood by those skilled in the art to which the present disclosure pertains (hereinafter referred to as "those skilled in the art") from the description below (hereinafter referred to as 'person of ordinary skill').

According to embodiments of the present disclosure, there is provided a vehicle, including an air guide disposed in a space between a radiator grille and a cooling module in a front end portion of a vehicle body to guide air introduced through the radiator grille to flow to a radiator of the cooling module, in which the air guide includes a first guide member fixed to a grille side structure of a front surface portion of the vehicle in which the radiator grille is positioned in the front end portion of the vehicle body and a second guide member installed in the cooling module-side structure which is a fixed structure coupled to the cooling module and spaced apart from the first guide member at an interval.

Accordingly, according to the vehicle provided with an air guide according to embodiments of the present disclosure, it is possible to optimize a flow of air that is introduced through a radiator grille in a front end portion of a vehicle body and then passes through a radiator and a cooling fan of a cooling module.

In particular, it is possible to minimize the amount of air that bypasses without passing through a radiator in a front end portion of a vehicle body while maximizing an inflow rate of fresh air that passes through a radiator grille and then is directed to the radiator and minimize the amount of air re-introduced into the radiator by passing through the radiator and a cooling fan and then flowing back forward. In addition, it is possible to minimize air flow resistance in the front end portion of the vehicle body.

In addition, it is possible to delete complex hydraulic components for driving the conventional hydraulic cooling fan, improve the cooling performance of the radiator, improve stack outlet temperature, delete a separate auxiliary radiator due to the increase in the cooling performance of the radiator, and the like.

It is understood that the term "automotive" or "vehicular" or other similar term as used herein is inclusive of motor vehicles in general such as passenger automobiles including sport utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, and wherein.

DETAILED DESCRIPTION OF ILLUSTRATIVE EMBODIMENTS

Figure 1:
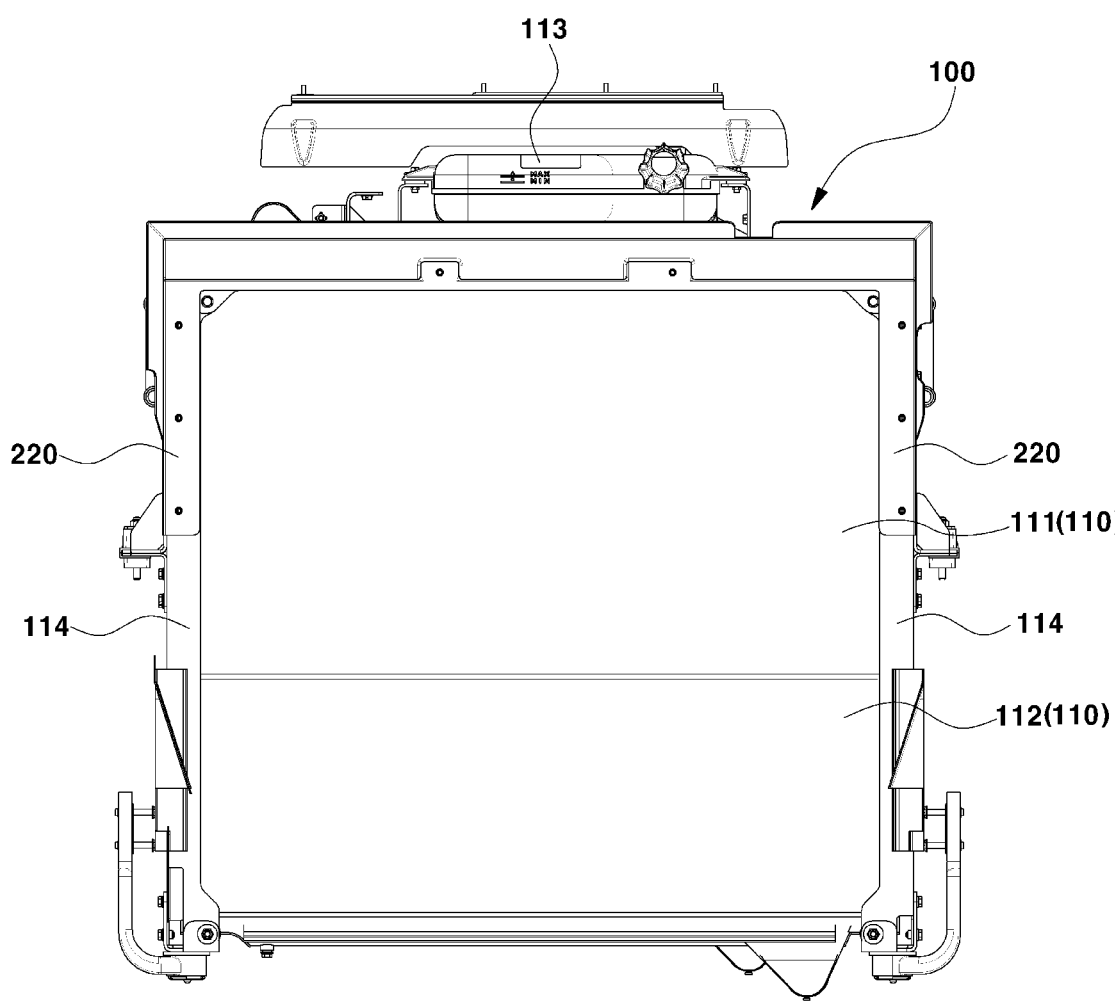
FIG. 1 is a front view illustrating a radiator of a cooling module in a vehicle according to an embodiment of the present disclosure.

Specific structural or functional descriptions presented in embodiments of the present disclosure are only exemplified for the purpose of describing embodiments according to the concept of the present disclosure, and the embodiments according to the concept of the present disclosure may be implemented in various forms. In addition, it should not be construed as being limited to the embodiments described in the present specification, and should be understood as including all modifications, equivalents, and substitutes included in the spirit and scope of the present disclosure.

Meanwhile, terms such as 'first', 'second', or the like may be used to describe various components, but these components are not to be construed as being limited to these terms. The terms are used only to distinguish one component from another component. For example, the 'first' component may be named the 'second' component and the 'second' component may also be similarly named the 'first' component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element interposed therebetween. Other expressions describing a relationship between components, that is, "between", "directly between", "neighboring to", "directly neighboring to" and the like, should be similarly interpreted.

Same reference numerals denote same constituent elements throughout the specification. Terms used in the present specification are for explaining embodiments rather than limiting the present disclosure. Unless explicitly described to the contrary, a singular form includes a plural form in the present specification. Components, steps, operations, and/or elements mentioned by terms "comprise" and/or "comprising" used in the present disclosure do not exclude the existence or addition of one or more other components, steps, operations, and/or elements.

An embodiment of the present disclosure provides a structure capable of optimizing a flow of air that is introduced through a radiator grille in a front end portion of a vehicle body and then passes through a radiator and a cooling fan of a cooling module.

More specifically, embodiments of the present disclosure provide a structure capable of minimizing the amount of air that bypasses without passing through a radiator in a front end portion of a vehicle body while maximizing an inflow rate of fresh air that is introduced through a radiator grille and then directed to the radiator, a structure capable of minimizing the amount of air re-introduced into the radiator by passing through a cooling fan and then flowing back forward, and an improved structure capable of minimizing air flow resistance in the front end portion of the vehicle body.

In embodiments of the present disclosure, an air guide for guiding the air introduced through the radiator grille in the front end portion of the vehicle body to the radiator at the rear thereof is provided.

Accordingly, the air introduced through the radiator grille in the front end portion of the vehicle body may all flow to the radiator of the cooling module by the air guide, so it is possible to solve a problem in that the air bypasses the radiator.

In addition, in embodiments of the present disclosure, a motor direct-connected electric cooling fan may be applied instead of a hydraulically driven cooling fan as a cooling fan of the cooling module in order to improve a problem of air flow resistance. In this way, the conventional complex hydraulic components disposed behind the cooling fan may be deleted.

Also, in embodiments of the present disclosure, in order to improve the problem of the air flow resistance, a position of a cross member is changed from a lower side of a blade of the cooling fan to a position of a rear of the blade so that a flow resistance of fan wake air passing through the blade is minimized. As a result, it is possible to improve cooling performance of the radiator and outlet temperature of a fuel cell stack.

In addition, various improved structures capable of optimizing the flow of air passing through the radiator in the front end portion and the cooling module of the vehicle and minimizing the air flow resistance are applied.

Hereinafter, embodiments of the present disclosure will be described in detail with reference to the drawings.

FIG. 1 is a front view illustrating a radiator of a cooling module in a vehicle according to an embodiment of the present disclosure.

First, the vehicle according to an embodiment of the present disclosure may be a commercial or passenger vehicle, specifically, may be a commercial fuel cell electric vehicle equipped with a fuel cell stack, and more specifically, a commercial fuel cell electric vehicle equipped with a plurality of fuel cell stacks.

In addition, the vehicle according to an embodiment of the present disclosure may be a hydrogen electric truck as a commercial fuel cell electric vehicle, and specifically, may be a hydrogen electric truck having a cab which is a vehicle body part tilted by a cab tilting system while being a part forming a driver's seat in the front end portion of the vehicle body.

The front end portion of the vehicle body of the vehicle according to an embodiment of the present disclosure includes a grille side structure constituting a portion (lower portion) of the front surface portion of the vehicle. A radiator grille, which is an air inlet through which air may be introduced into the inner space of the front end portion of the vehicle body, is formed or provided in the grille side structure.

In a front end portion of a vehicle body of a truck, forming a radiator grille in the front surface portion of vehicle is a known art, and since the radiator grille is a configuration well known to those skilled in the art, the radiator grille is not illustrated in detail.

The grille side structure (reference numeral "2" in FIG. 2B to be described later) in which the radiator grille is formed or provided in the vehicle according to an embodiment of the present disclosure may be a cab (not illustrated) tilted up and down by a cab tilting system while being a part that forms the driver's seat in the front end portion of vehicle body, and more specifically, may be a front panel that becomes a front surface portion of the vehicle even in the cab.

The cab is a movable vehicle body part that is tilted by the cab tilting system, and thus, the grille side structure 2, which is the front panel of the cab, also becomes a portion of the movable vehicle body part.

In addition, a cooling module (reference numeral "100" in FIG. 1) including a radiator (reference numeral "110" in FIG. 1) and a cooling fan (not illustrated in FIG. 1) is disposed behind the front panel (grille side structure 2) of the cab. In this case, the cooling module 100 is mounted on a fixed vehicle body part that does not move, not a movable vehicle body part, in the front end portion of the vehicle body.

In the cooling module 100, the radiator 110 may have a rectangular shape as illustrated in FIG. 1 in its overall shape, which may include a PE component radiator 111 and a stack radiator 112 that are spaced apart from each other at a predetermined interval in front and rear.

The PE component radiator 111 is a radiator for cooling power electronic components (hereinafter referred to as "PE components") such as a motor and an inverter that are vehicle driving sources, and the stack radiator 112 is a radiator for cooling a fuel cell stack.

In the vehicle according to an embodiment of the present disclosure, the PE component radiator 111 may be provided to have a relatively small front area compared to the stack radiator 112, and the PE component radiator 111 may be disposed in front of the cooling module 100, and the stack radiator 112 may be disposed behind the cooling module 100.

A surge tank 113 in which a coolant is stored may be installed above the radiator 110. The surge tank 113 may include a PE component surge tank in which the PE component coolant circulating between the PE component radiator 111 and the PE component (component to be cooled) is stored and a stack surge tank in which the stack coolant circulating between the stack radiator 112 and the fuel cell stack (component to be cooled) is stored.

As illustrated in FIG. 1, the stack surge tank and the PE component surge tank may be provided in an integrated surge tank 113 in which an inner space of an integrated container is partitioned, by a partition wall, into a space where the stack coolant and the PE component coolant may each be stored.

In this case, the integrated surge tank 113 may be positioned at a center of the upper side of the radiator 110. FIG. 1 illustrates an embodiment in which the integrated surge tank 113 is installed in the center of the upper side of the radiator 110.

Alternatively, the stack surge tank and the PE component surge tank may be separately provided and installed to be disposed above the PE component radiator 111 and the stack radiator 112. In this case, the stack surge tank and the PE component surge tank may be installed to be disposed on the left and right sides above the PE component radiator 111 and the stack radiator 112, respectively.

Figure 2A:
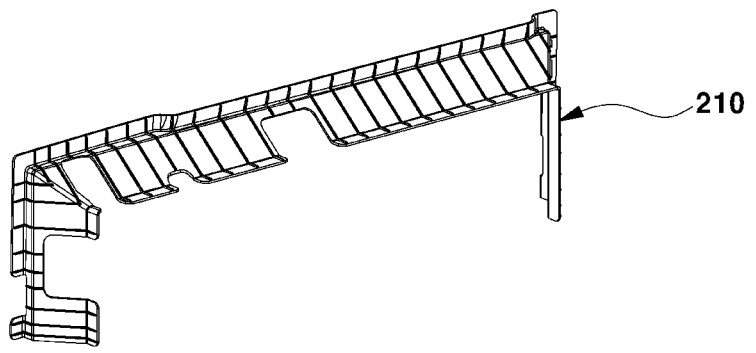
FIGS. 2A and 2B are perspective views illustrating a first guide member mounted on a front end portion of a vehicle body in the vehicle according to an embodiment of the present disclosure.
Figure 2B:
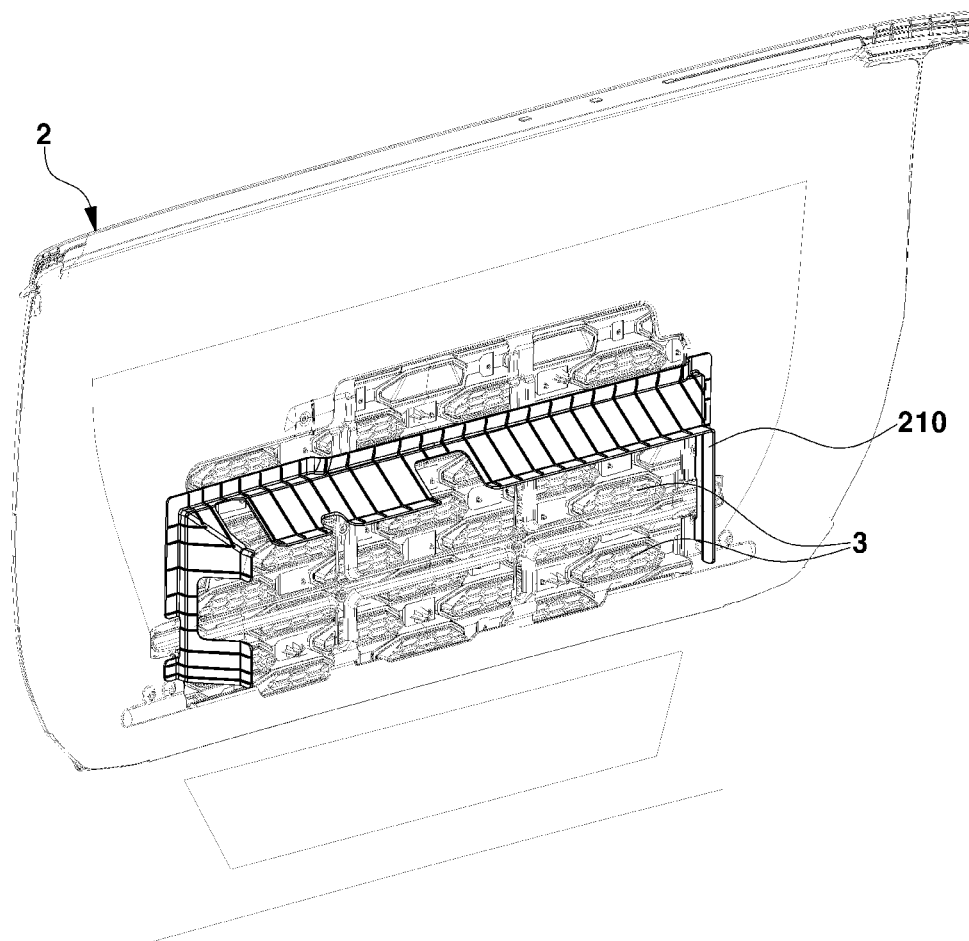
Figure 3:
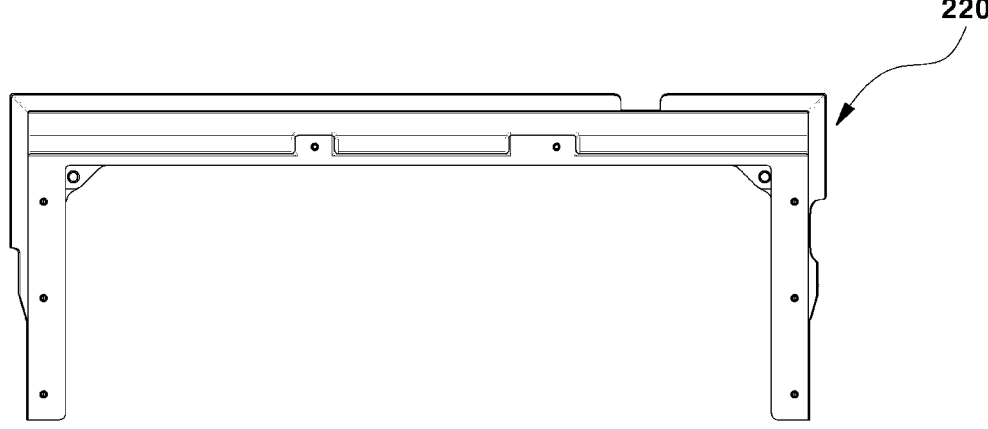
FIG. 3 is a front view illustrating a second guide member mounted on a cooling module side structure in the vehicle according to an embodiment of the present disclosure.

FIGS. 2A and 2B are perspective views illustrating the front panel (grille side structure 2) constituting the front surface portion of the vehicle and a first guide member 210 mounted thereon, in the front end portion of the vehicle body in the vehicle according to an embodiment of the present disclosure, and FIG. 3 is a front view illustrating a second guide member 220 mounted on a cooling module side structure 114 in the vehicle according to an embodiment of the present disclosure.

The vehicle according to an embodiment of the present disclosure is provided with an air guide (reference numeral "200" in FIG. 4 to be described later) configured to include the first guide member 210 and the second guide member 220. More specifically, the vehicle according to an embodiment of the present disclosure includes the air guide (reference numeral "200" in FIG. 4) that is disposed between the radiator grille 3 and the radiator 110 of the cooling module 100 in the front end portion of the vehicle body to guide air introduced through the radiator grille 3 to flow to the radiator 110.

In an embodiment of the present disclosure, the air guide 200 is configured to include the first guide member 210 that is fixed to the front panel 2 which is the grille side structure in the vehicle and the second guide member 220 that is disposed in parallel to be spaced apart from the first guide member 210 at a predetermined interval.

FIG. 2A illustrates the first guide member 210, and FIG. 2B illustrates the front panel 2 of the cab. FIG. 2B illustrates the radiator grille 3 formed or provided to allow air to pass through the front panel 2. In addition, FIG. 2B illustrates the state in which the first guide member 210 is mounted on the inner side surface of the front panel 2.

In an embodiment of the present disclosure, the first guide member 210 and the second guide member 220 may be installed to be disposed along at least one of the upper and lower sides and the left and the right of the radiator in the entire outer circumferential portion of the radiator 110.

In addition, the first guide member 210 may have a frame shape as illustrated in FIG. 2A in its overall shape in order to be disposed along the outer circumferential portion of the radiator in front of the radiator 110 illustrated in FIG. 1.

The first guide member 210 may be installed in the cab that is the movable vehicle body part, and even in this cab, may be fixedly mounted on the inner side surface of the front panel 2 of the cab which is the grille side structure formed or provided with the radiator grille 3.

In addition, as illustrated in FIG. 1, the second guide member 220 may be installed in the cooling module side structure 114 to which the radiator 110 of the cooling module 100 is coupled. Here, the cooling module side structure 114 is a fixed structure coupled to the radiator 110 of the cooling module 100, and may include a mounting member that fixes and mounts the radiator 110 to a vehicle body frame (not illustrated) in the fixed vehicle body part in the front end portion of the vehicle body.

In an embodiment of the present disclosure, the mounting member which is the cooling module side structure 114 may be disposed and coupled along the outer circumferential portion of the radiator 110. In this case, the second guide member 220 may also be installed to be disposed along the outer circumferential portion of the radiator 110 (refer to FIG. 1). In this case, like the first guide member 210, the second guide member 220 may also have a shape of a frame that is integrated as a whole, but may also have a configuration in which a plurality of members are combined.

Even when the second guide member 220 has a configuration in which a plurality of members are combined, each member constituting the second guide member 220 may be disposed along a circumferential portion of the radiator 110 (refer to FIG. 1).

In this case, the installation of the second guide member 220 may be omitted in a partial section of the upper side of the radiator 110, in which the surge tank 113 is installed, among all sections of the rectangular circumferential portion of the radiator 110. That is, the second guide member 220 may have a shape in which a portion of the upper side is deleted, that is, a shape in which a portion corresponding to a partial section of the upper side of the radiator 110 is deleted.

As such, in embodiments of the present disclosure, the air guide 200 including the first guide member 210 and the second guide member 220 is installed to be disposed along the circumference of the radiator from the front of the radiator 110 to guide air introduced from the front while the vehicle is driving, that is, cold air introduced through the radiator grille 3 to flow to the radiator 110.

In embodiments of the present disclosure, the air guide causes the cold air introduced while the vehicle is driving at high speed to be completely introduced only into the radiator without bypassing through portions other than the radiator.

Furthermore, in embodiments of the present disclosure, the air guide prevents the hot air passing through the radiator from being re-introduced into the front of the radiator after colliding with the resistor behind the radiator and flowing back forward.

As a result, the cooling performance of the radiator and the outlet temperature of the fuel cell stack may be improved, and as the cooling performance of the radiator is greatly improved, a separate auxiliary radiator is not required.

Figure 4:
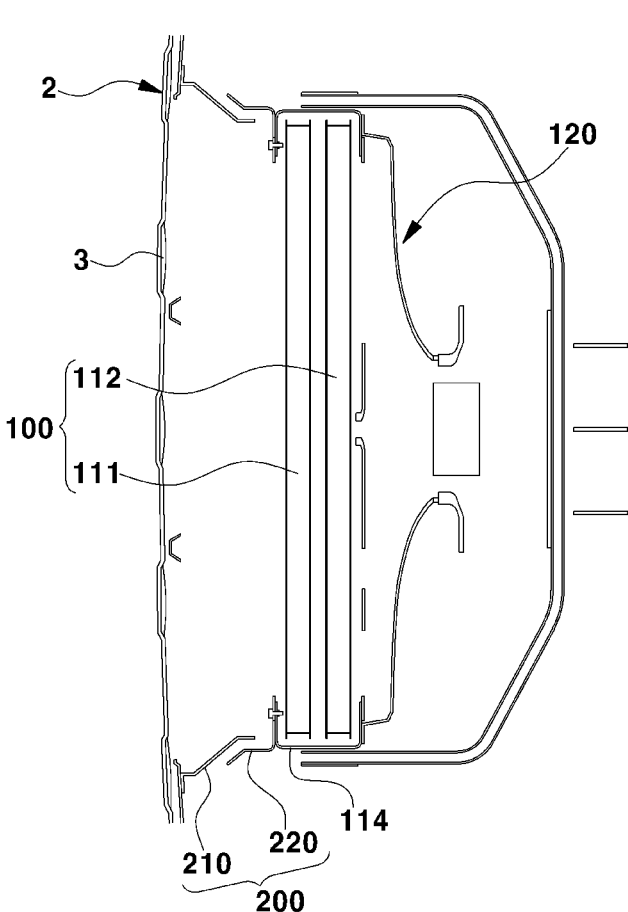
FIGS. 4 and 5 are cross-sectional views illustrating a front end portion of a vehicle body and a cooling module in the vehicle according to an embodiment of the present disclosure.
Figure 5:
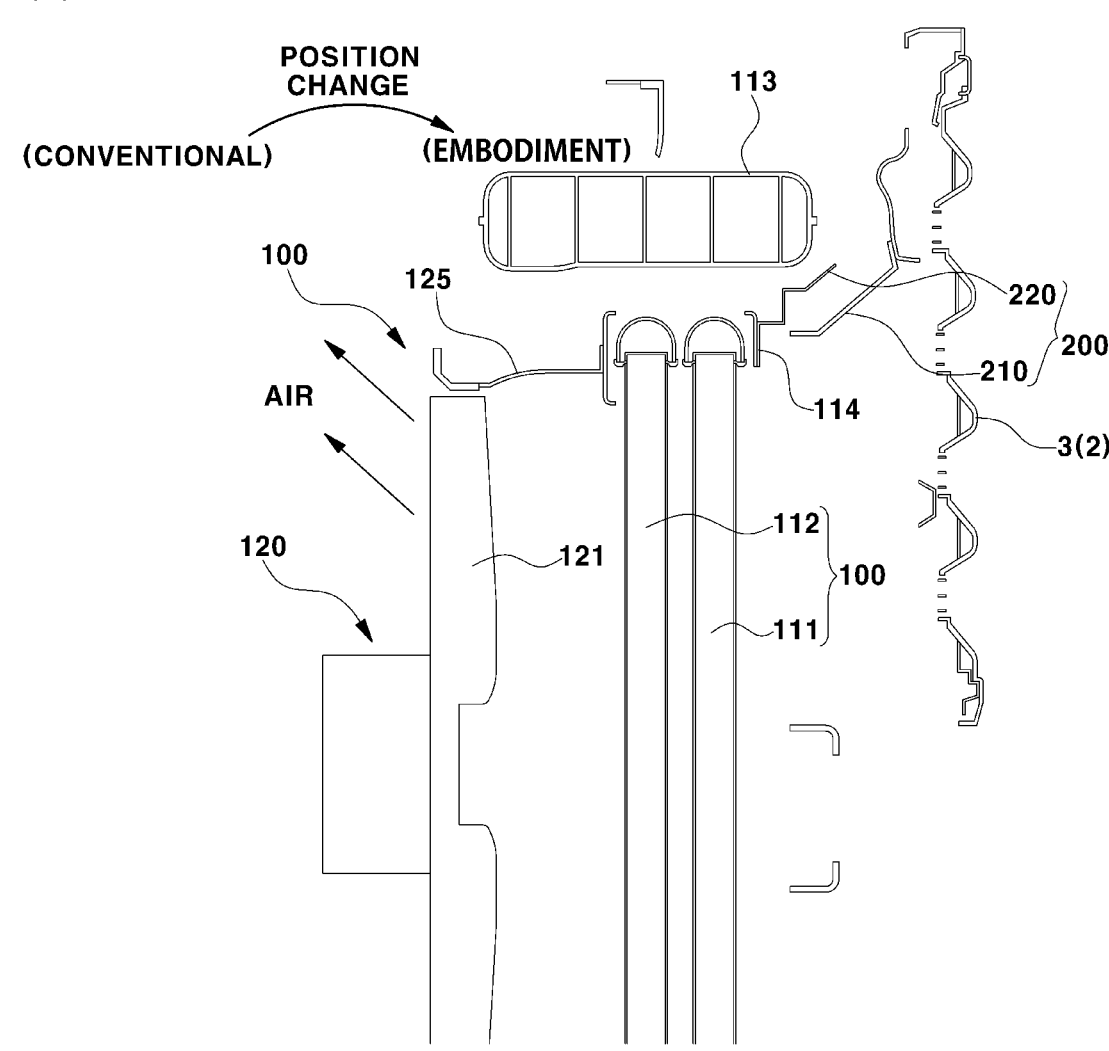
Figure 6:
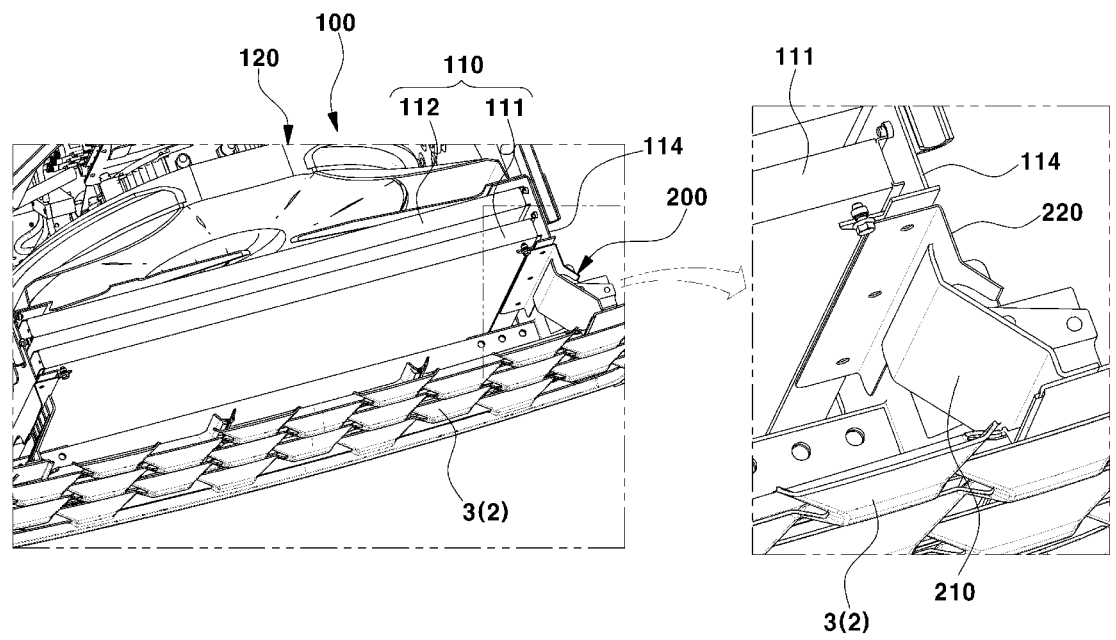
FIGS. 6 and 7 are cross-sectional views illustrating the front end portion of the vehicle body and the cooling module in the vehicle according to an embodiment of the present disclosure.
Figure 7:
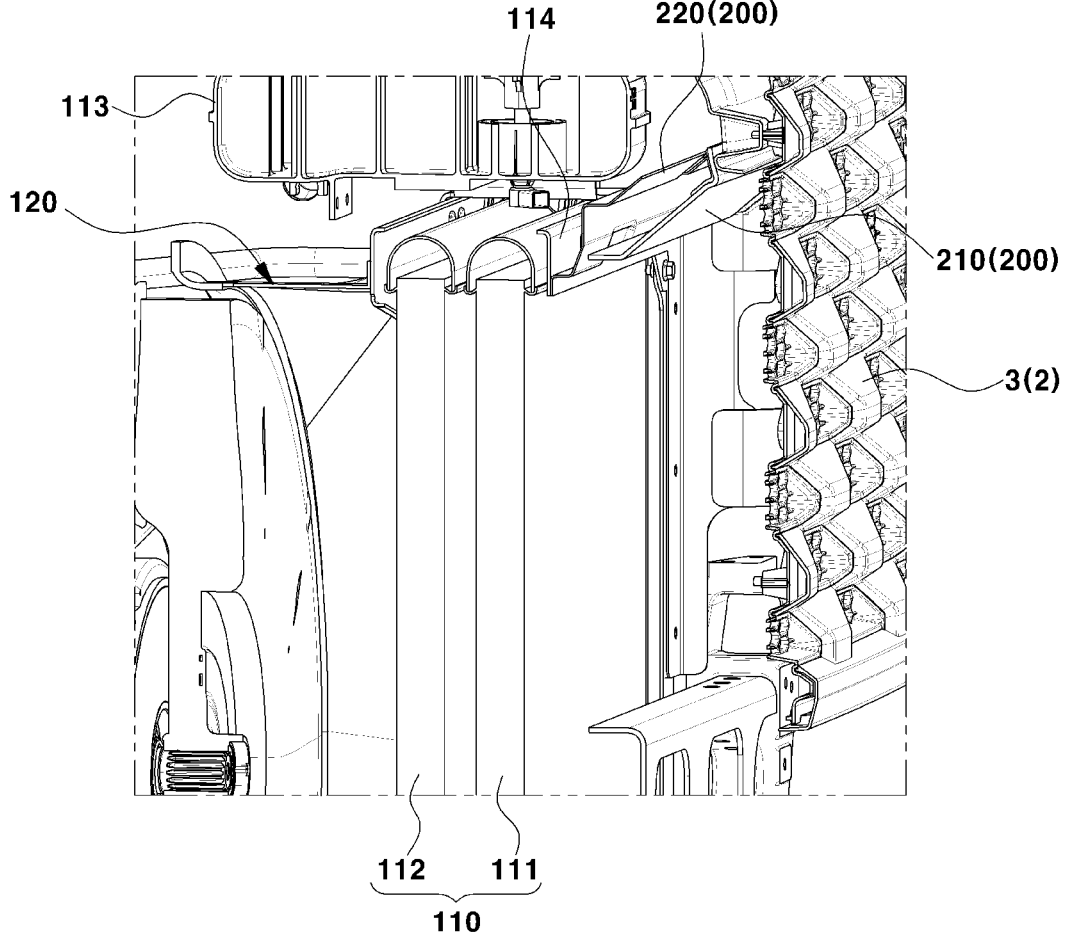

FIGS. 4 and 5 are cross-sectional views illustrating the front end portion of the vehicle body and the cooling module in the vehicle according to an embodiment of the present disclosure, and FIGS. 6 and 7 are cross-sectional perspective views of the front end portion of the vehicle and the cooling module according to an embodiment of the present disclosure. FIG. 6 is a cross-sectional perspective view taken along a horizontal line as illustrated in FIG. 4, and FIG. 7 is a cross-sectional perspective view taken along a vertical line as illustrated in FIG. 5.

Reference numeral "111" denotes a PE component radiator in the radiator 110, and reference numeral 112 denotes a stack radiator in the radiator 110. In addition, reference numeral "120" denotes a cooling fan installed behind the radiator 110 in the cooling module 100, and reference numeral "113" denotes a surge tank disposed above the radiator 110. Here, the surge tank 113 may be the stack surge tank, the PE component surge tank, or the integrated surge tank.

As illustrated, the air guide 200 includes the first guide member 210 and the second guide member 220, and the first guide member 210 may be fixed to the inner side surface of the front panel of the grille side structure 2, for example, the cab (not illustrated) that is the movable vehicle body structure.

In this case, the second guide member 220 may be fixed to the cooling module side structure 114, for example, the mounting member that mounts and fixes the radiator 110 to the vehicle body frame among the fixed vehicle body parts.

The first guide member 210 and the second guide member 220 may be plate-shaped members and may each be fixed to the grille side structure (front panel 2) and the cooling module side structure (mounting member 114) by methods such as bolting, riveting, welding, and bonding.

The first guide member 210 and the second guide member 220 may be disposed to have an inclined cross-sectional shape and structure in the space between the radiator grille 3 and the radiator 110 in front of the radiator 110 (refer to FIG. 4).

As a result, the air introduced through the radiator grille 3 may be collected and flow toward the front of the radiator 110 while being guided by the first guide member 210 and the second guide member 220.

In an embodiment of the present disclosure, the first guide member 210 and the second guide member 220 are installed to be spaced apart from each other to have a predetermined interval, but are installed along the circumference of the radiator so that the space between the front panel 2 of the cab and the radiator grille 3 and the radiator 110 may be separated to some extent from an outer space on the side of the radiator.

In this case, the first guide member 210 and the second guide member 220 constituting the air guide 200 are spaced apart from each other to partially overlap each other in the front-rear direction or up-down direction of the vehicle as illustrated in FIGS. 4 and 5.

In a typical truck, the cab is a movable vehicle body part that is tilted by the cab tilting system while being a part forming a driver's seat. For example, during vehicle maintenance, the cab needs to move to an up state, and remains in a down state while driving after the vehicle maintenance. In addition, while a truck is driving, the cab on which the driver rides continues to move up and down.

When the air guide (i.e., the second guide member) is installed only in the cooling module side structure (the mounting member 114) in the fixed vehicle body part, the air guide (the second guide member) fixed when the cab moves may contact or impact the inner side surface of the front panel 2 that is the grille side structure.

Accordingly, the air guide (i.e., the second guide member) fixed to the fixed vehicle body part (the cooling module side structure) needs to be installed to be spaced apart from the inner side surface of the front panel at an appropriate interval so as not to touch or impact the inner side surface of the front panel 2 which is the movable vehicle body part (the grille side structure) in consideration of the movement of the cab.

However, as described above, when the air guide (the second guide member) is installed only in the cooling module side structure (the mounting member 114) to be spaced apart from the inner side surface of the front panel 2 which is the grille side structure of the cab, the entire amount of air introduced through the radiator grille 3 of the front panel 2 does not completely flow only to the radiator 110, and the air passing through the radiator grille 3 may bypass the radiator 110 while escaping into a separated space between the front panel 2 and the air guide (the second guide member).

In addition, after the hot air passing through the radiator 110 collides with the resistor behind the radiator and flows back forward, it then may be re-introduced into the front of the radiator through the separated space between the air guide (the second guide member) installed in the cooling module side structure 114 and the inner side surface of the front panel 2 of the cab, thereby reducing the cooling performance of the radiator.

Therefore, in embodiments of the present disclosure, to prevent the above-described problem from occurring, in addition to the second guide member 220 installed in the cooling module side structure 114 which is the fixed vehicle body part, the first guide member 210, which is a separate air guide, is additionally installed on the inner side surface of the front panel (the grille side structure 2) which is the movable vehicle body part.

Accordingly, the fresh air introduced through the radiator grille 3 while the first guide member 210 and the second guide member 220 are combined at an interval from each other may be completely guided to the radiator 110 by the two guide members spaced apart from each other. Accordingly, it is possible to minimize the amount of air that is discharged from the space between the radiator grille 3 and the radiator 110 to the outside to bypass the radiator 110.

Referring to FIG. 5, the position of the conventional surge tank and the position of the surge tank of an embodiment of the present disclosure are illustrated. As illustrated, conventionally, the surge tank is positioned at the upper side behind the cooling fan, but in an embodiment of the present disclosure, the surge tank 113 is positioned above the radiator 110. As described above, the position of the surge tank 113 is changed from the upper side behind the conventional cooling fan to the upper side of the radiator 110, thereby improving the air flow structure.

That is, when the cooling fan 120 is driven to rotate the blade 121, some of the air (fan wake air) blown backward through the blade 121 flows obliquely upward (arrow direction in FIG. 5).

Conventionally, since the surge tank 113 is positioned at the upper side behind the cooling fan 120, the surge tank exists on the flow path of the fan wake air, and when the air blown backward through the blade 121 rises obliquely, the air collides with the surge tank 113. That is, the surge tank 113 may be a resistor against the fan wake air.

On the other hand, in an embodiment of the present disclosure, since the position of the surge tank 113 is changed to the upper side of the radiator 110 as illustrated in FIG. 5, the fan wake air blown backward through the blade 121 is not interfered with by the surge tank 113, and since the fan wake air does not collide with the surge tank, the air flow resistance by the surge tank does not occur.

Figure 8:
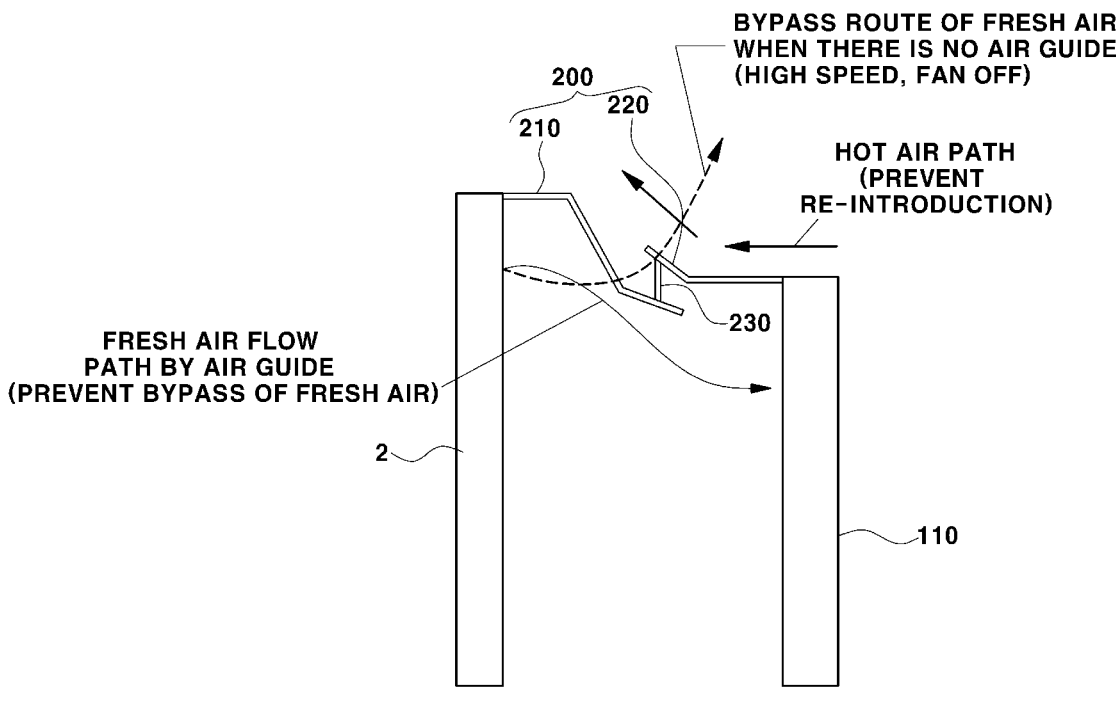
FIGS. 8 and 9 are views illustrating a state in which fresh air is prevented from bypassing the radiator by an air guide in an embodiment of the present disclosure.
Figure 9:
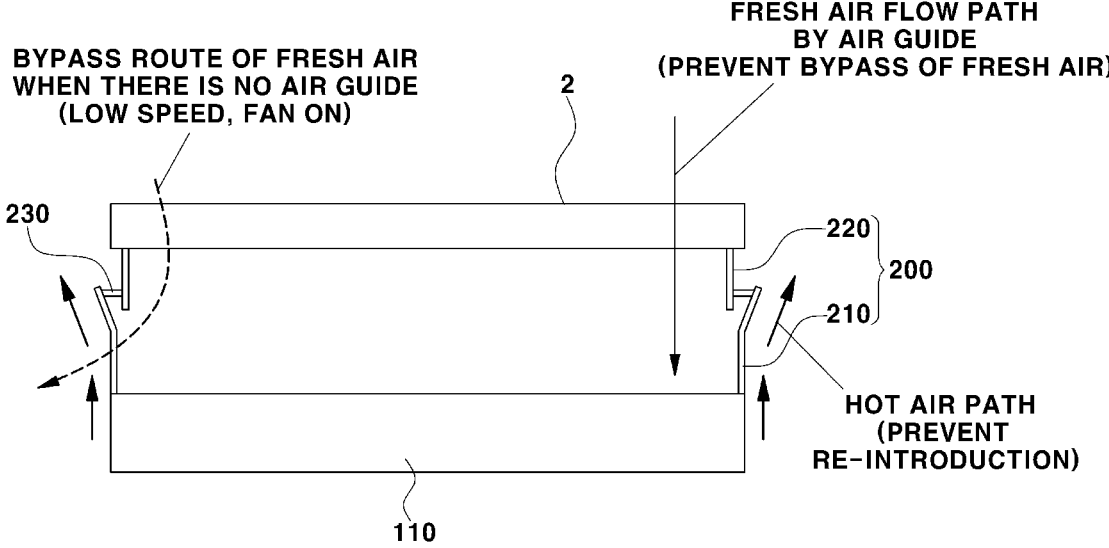

Next, FIGS. 8 and 9 are views illustrating a state in which fresh air is prevented from bypassing the radiator due to the air guide in an embodiment of the present disclosure. FIG.

8 is a side view (or a cross-sectional view taken along a vertical line). Referring to FIG. 8, the left direction of the drawing is the front with respect to the vehicle body direction, and it can be seen that the front panel 2 of the cab provided with the radiator grille (not illustrated) is disposed in the front and the radiator 110 of the cooling module is disposed in the rear. FIG. 9 is a plan view (or a cross-sectional view taken along a horizontal line), in which the upper direction of the drawing is the front with respect to the vehicle body direction.

As illustrated, there is a space serving as an air flow path between the front panel 2 provided with the radiator grille (not illustrated) and the radiator 110 of the cooling module. Accordingly, the fresh air introduced through the radiator grille of the front panel 2 passes through the space and passes through the radiator 110 of the cooling module, and the coolant flowing inside the radiator 110 radiates heat to air passing around the radiator.

Referring to the drawing, it can be seen that the first guide member 210 and the second guide member 220 are disposed between the front panel 2 and the radiator 110 in front of the radiator 110 to partially overlap each other at an interval.

In this time, since the first guide member 210 and the second guide member 220 are spaced apart from each other, the first guide member 210 and the second guide member 220 do not come into contact with each other even when the cab moves up and down while the vehicle is driving, and the first guide member 210 and the second guide member 220 do not impact each other.

As a result, even if the cab, which is a movable vehicle body part, and the front panel 2 of the cab move while the vehicle is driving, the first guide member 210 and the second guide member 220 may prevent the fresh air from bypassing the radiator 110 without contacting each other or impacting each other.

For example, if there is no air guide 200, when the vehicle is driving at high speed and the cooling fan is turned off, the fresh air introduced through the radiator grille provided in the front panel 2 is discharged upward as illustrated in FIG. 8 to bypass the radiator 110 of the cooling module. In addition, the hot air passing through the radiator 110 may be re-introduced into the front of the radiator by colliding with the resistor behind the radiator and then flowing back.

In addition, if there is no air guide 200, when the vehicle is driving at low speed and the cooling fan is turned on, the fresh air introduced through the radiator grille provided in the front panel 2 is discharged from the left to right as illustrated in FIG. 9 to bypass the radiator 110 of the cooling module. In addition, similarly, the hot air passing through the radiator 110 may be re-introduced into the front of the radiator by colliding with the resistor behind the radiator and then flowing back.

In an embodiment of the present disclosure, even if the cab moves, it is preferable that the first guide member 210 and the second guide member 220 maintain a predetermined interval. Accordingly, a spacer 230 made of an elastic material may be installed between the first guide member 210 and the second guide member 220 so that contact between the two guide members may be reliably prevented.

The spacer 230 maintains an interval between the two guide members while preventing two guide members 210 and 220 from contacting each other, and a material made of rubber or the like may be used. The spacer 230 may be interposed between facing surfaces of the two guide members 210 and 220, and may be fixed to one surface of the two guide members 210 and 220 by bonding or the like.

For example, the spacer 230 may be fixed to the surface of the second guide member 220, and the spacer 230 is not fixed to the first guide member 210 so that the first guide member 210 can be separated from the spacer 230 when the cab moves.

On the other hand, the spacer 230 may be fixed to the surface of the first guide member 210, and when the cab moves, the spacer 230 only contacts the second guide member 220 but is not fixed so that the spacer 230 may be separated from the second guide member 220 while moving together with the first guide member 210.

In addition, the plurality of spacers 230 may be installed between the two guide members 210 and 220 so as to be disposed at a predetermined interval along the longitudinal direction of the two guide members 210 and 220.

Meanwhile, the cooling fan 120 is installed behind the radiator 110 in the cooling module 100 of the vehicle. When the cooling fan 120 positioned behind the radiator 110 sucks air, the air sucked in from the front by the cooling fan 120 may pass through the radiator 110.

An electric cooling fan may be used as the cooling fan 120 in the vehicle according to an embodiment of the present disclosure. In this case, the electric cooling fan may be a motor direct-connected high-output electric cooling fan in which a blade (rotor blade) is directly connected to the rotor shaft of the fan motor.

Figure 10:
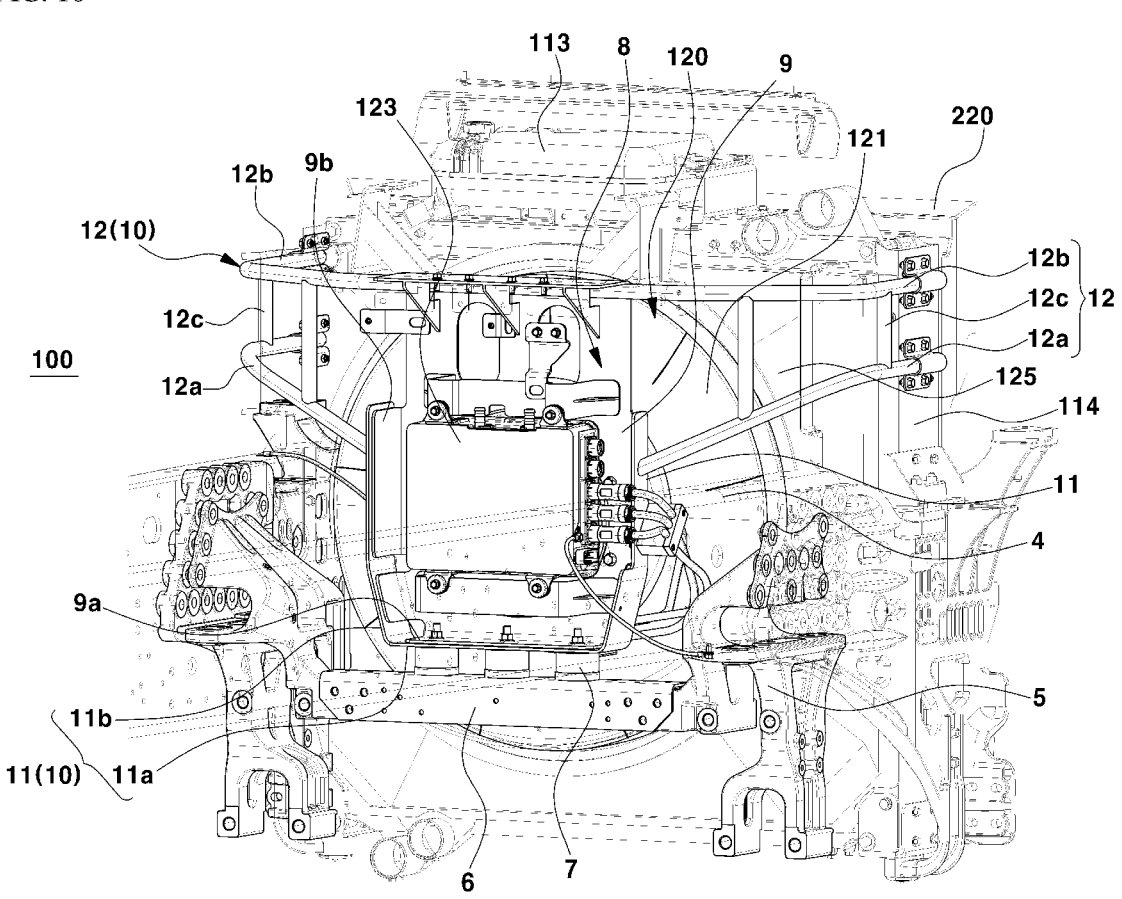
FIG. 10 is a rear perspective view illustrating the cooling module in the vehicle according to an embodiment of the present disclosure.
Figure 11:
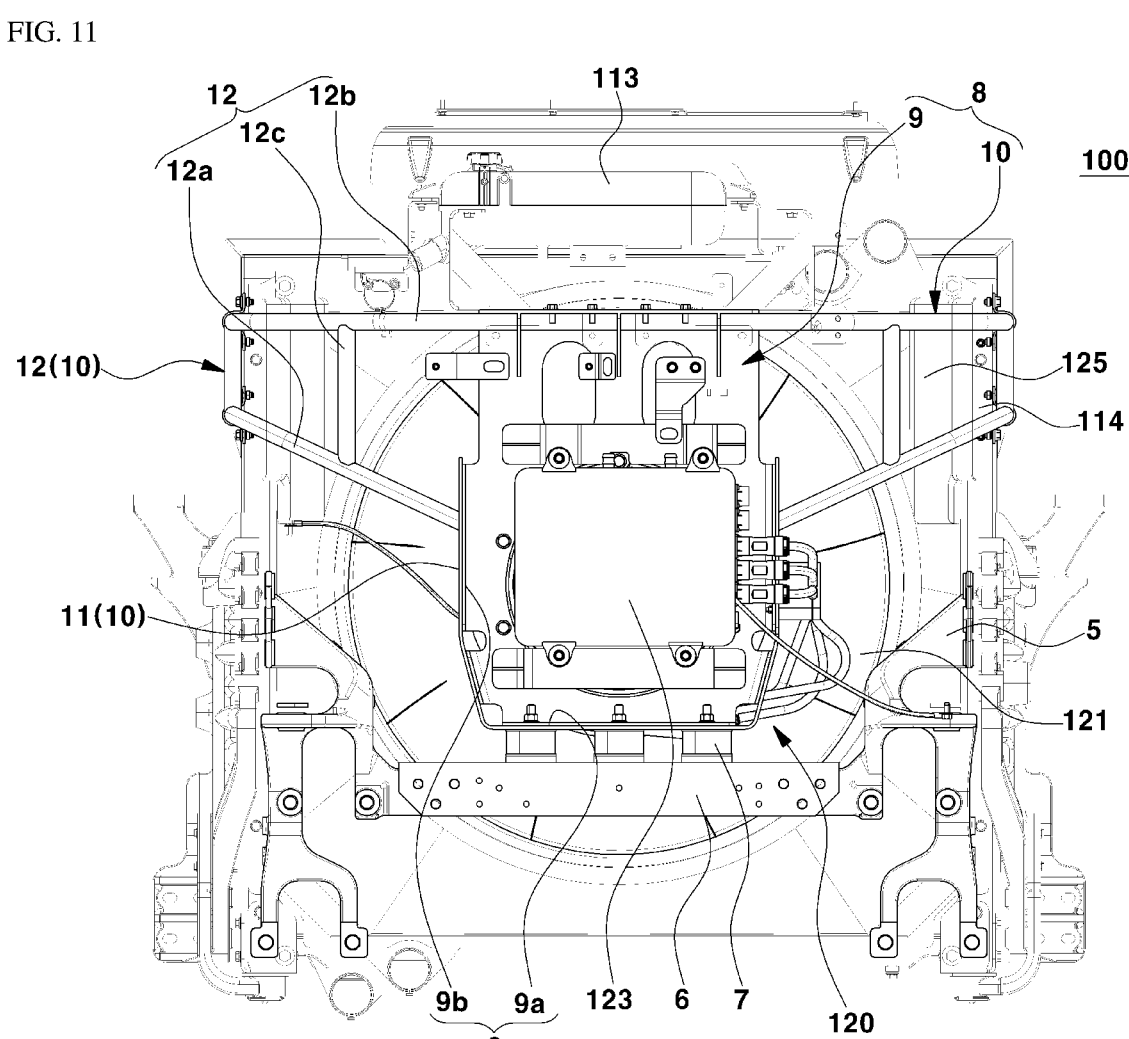
FIG. 11 is a rear view of the cooling module in the vehicle according to an embodiment of the present disclosure.
Figure 12:
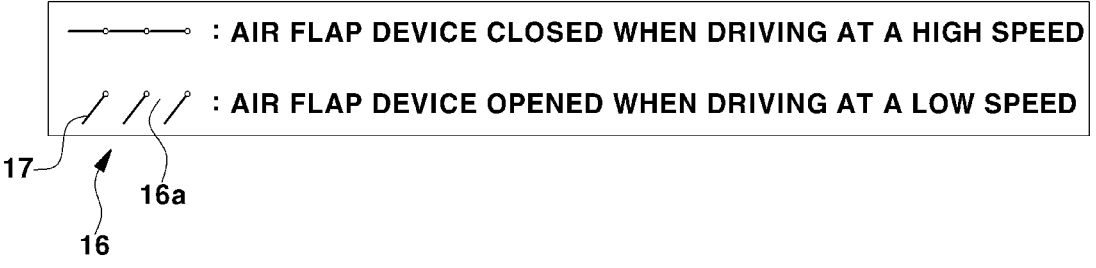
FIG. 12 is a side view of the cooling module in the vehicle according to an embodiment of the present disclosure.
Figure 13:
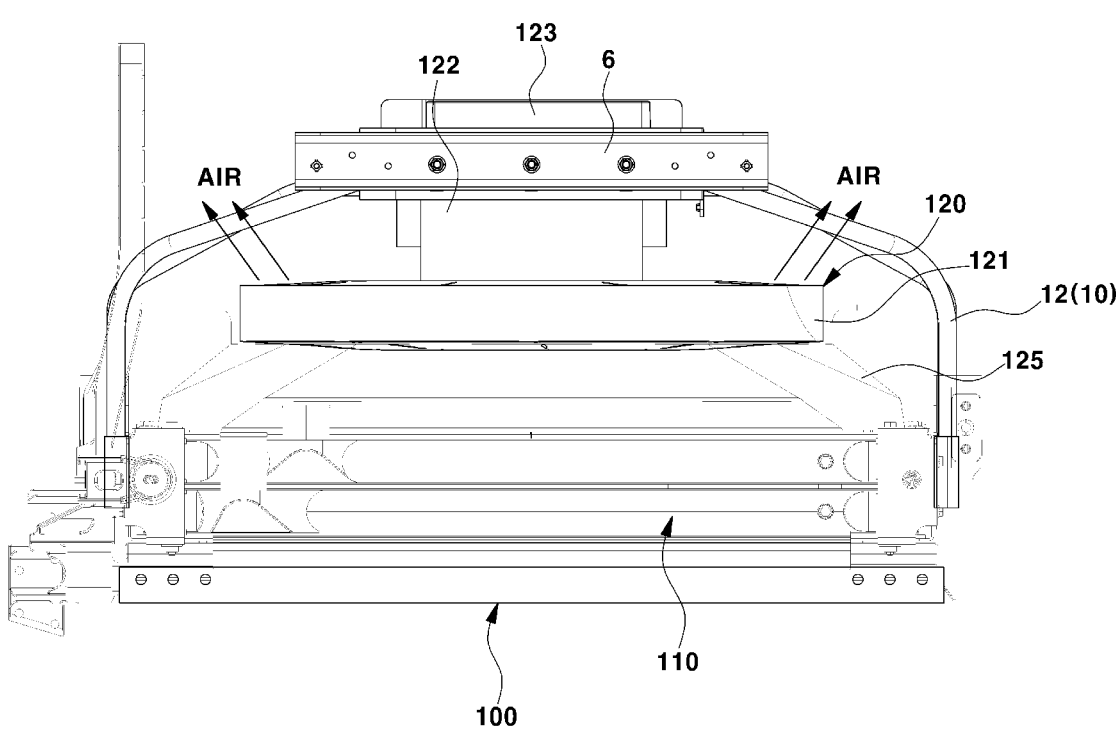
FIG. 13 is a bottom view of the cooling module in the vehicle according to an embodiment of the present disclosure.

FIG. 10 is a rear perspective view illustrating the cooling module in the vehicle according to an embodiment of the present disclosure, and FIG. 11 is a rear view of the cooling module. In addition, FIG. 12 is a side view of the cooling module in the vehicle according to an embodiment of the present disclosure, and FIG. 13 is a bottom view of the cooling module.

In FIG. 10, reference numeral "4" denotes the vehicle body frame in the fixed vehicle body part. The vehicle body frame 4 is a vehicle body part disposed to extend long along the front-rear direction of the vehicle from left and right sides of the vehicle body. In the vehicle, the cooling module 100 including the radiator 110 and the cooling fan 120 is mounted and supported on the vehicle body frame 4 via the mounting member 114.

In addition, the cross member 6 is installed to connect between the vehicle body frames 4 on the left and right sides in the front end portion of the vehicle body, and the cross member 6 is disposed to extend long along the left-right direction of the vehicle between the vehicle body frames 4 on the left and right sides.

In this case, the cross member 6 may have a straight shape along the longitudinal direction, and the cross member 6 may be installed to cross the space behind the blade 121 of the cooling fan 120 in the form of a long straight line in the left and right lateral directions.

The cross member 6 is installed to be mounted and supported on the vehicle body frame 4 on the left and right sides via the fixing brackets 5, and the fixing brackets are each installed on the front end portions of the two vehicle body frames 4 on the left and right sides, respectively, and the end portions of the cross member 6 are coupled to each of the fixing brackets 5 on the left and right sides. That is, the left and right end portions of the cross member 6 are coupled to the front end portions of the two vehicle body frames 4 on both sides via the two fixing brackets 5 on the left and right sides.

In this case, the vehicle body frame 4, the fixing bracket 5, and the cross member 6 may be coupled to each other by a method such as bolting or welding. That is, the coupling portions of the parts 4, 5, and 6 may be fastened and fixed to each other by a plurality of bolts, and in this case, the bolting and welding may be used together.

Further, in an embodiment of the present disclosure, a fan mounting bracket 8 is mounted on the upper surface of the cross member 6 so as to be supported via the insulator 7 with the insulator 7 interposed therebetween, and the fan motor (not illustrated in FIGS. 10 and 11; reference numeral "122" in FIGS. 12 and 13) and the inverter 123 of the electric cooling fan 120 are mounted on the fan mounting bracket 8 to be supported.

In an embodiment of the present disclosure, the electric cooling fan 120 may be configured to include the blade (rotor blade, 121) that sucks air, the fan motor 122 that rotates the blade 121, the inverter 123 that applies a three-phase current to the fan motor 122, and a controller (not illustrated) that duty-controls a three-phase switch of the inverter 123.

Here, although not illustrated in detail in the drawings, the blade 121 may be configured to include a ring part (not illustrated), a hub (not illustrated) which is a central portion to which the rotor shaft of the fan motor 122 is connected, and a plurality of blades (not illustrated) formed to connect between the ring part and the hub.

The inverter 123 is connected to receive a current from a battery or fuel cell stack that is a direct current power source and converts a direct current (DC) current supplied from a power source into a three-phase alternating current (AC) current when the fan motor 122 is driven and applies the three-phase alternating current (AC) current to the fan motor 122 through a power cable.

As described above, by applying the electric cooling fan instead of the conventional hydraulically driven cooling fan, complex fan driving components disposed behind the cooling fan, that is, the existing hydraulic components, such as the oil tank, the oil cooler, or the oil hose, that may act as a resistor to the flow of air, may be deleted.

Accordingly, it is possible to reduce the resistance acting on the air passing through the cooling fan and minimize the re-introduction of the hot air into the radiator by flowing backwards in front of the radiator due to the resistance.

In this way, it is possible to greatly increase an absolute amount of fresh air (cool air newly introduced through the radiator grille) introduced into the radiator and a flow rate of fresh air passing through the radiator, and as a result, it is possible to increase the cooling performance of the radiator.

In an embodiment of the present disclosure, for mounting of the cooling module 100, the mounting member 114 is coupled to the front end portion of the vehicle body frame 4 on the left and right sides directly or via a separate bracket as a medium, and as described above, the radiator 110 is disposed and mounted on the inside of the mounting member 114. The mounting member 114 is the above-described cooling module side structure, and as described above, the second guide member 220 is installed in the mounting member 114.

In addition, as described above, the fan mounting bracket 8 is mounted to be supported on the upper surface of the cross member 6 via the insulator 7, and the fan motor 122 and the inverter 123 of the electric cooling fan 120 are mounted on the fan mounting bracket 8 to be supported.

The fan mounting bracket 8 may be configured to include a plate-shaped bracket body 9 and a supporter 10 integrally coupled to the bracket body 9. Here, the bracket body 9 has a lower surface portion 9a formed by bending along the circumference of the lower end and a side portion 9b formed by bending along the circumference of the side end.

In addition, the supporter 10 may be configured to include a frame 11 that is coupled to overlap and be in surface contact with the lower surface portion 9a and the side portion 9b of the bracket body 9, and a rod type bracket 12 that supports and fixes the frame 11 by connecting to the mounting member 114 which is a cooling module side structure in the fixed vehicle body part.

In the fan mounting bracket 8, the bracket body 9 is installed in a vertically erected form. In this case, the fan motor 122 is mounted by being integrally coupled to the front of the bracket body 9, and the inverter 123 is integrally coupled and mounted on the rear side of the bracket body 9.

The frame 11 of the supporter 10 in the fan mounting bracket 8 is a plate-shaped member provided so that the overall shape has a "U" shape, and in the frame 11 of the supporter 10, the lower surface portion 11a is coupled to overlap an outer side surface of the lower surface portion 9a of the bracket body 9.

In this case, the lower surface portion 11a of the frame 11 of the supporter 10 is coupled to the insulator 7, and thus, the frame 11 of the supporter 10 is supported on the upper surface of the cross member 6 via the insulator 7. In addition, the lower surface portion 9a of the bracket body 9, the lower surface portion 11a of the frame 11, and the insulator 7 may be fastened and fixed to each other by bolts and nuts.

In addition, in the supporter 10 of the fan mounting bracket 8, the rod type bracket 12 is installed to connect between the left and right side portions 11b of the frame 11 and the mounting member 114 which is the cooling module side structure, and between the upper end portion of the bracket body 9 of the fan mounting bracket 8 and the mounting member 114.

The rod type bracket 12 is a support structure that substantially supports the fan mounting bracket 8 from the cross member 6 and the mounting member 114, and may have a configuration in which a plurality of rods having a predetermined diameter are combined.

In this case, the rod type bracket 12 includes a first rod 12a connecting between the left and right side surface portions 11b of the frame 11 and the mounting member 114 in the supporter 10, a second rod 12b connecting between the upper end portion of the bracket body 9 and the mounting member 114, and a plurality of third rods 12c connecting between the first rod 12a and the second rod 12b.

As described above, in the state in which the fan motor 122 and the inverter 123 are fixedly mounted to the fan mounting bracket 8, more specifically, the bracket body 9 of the fan mounting bracket 8, the blade 121 is directly connected to the rotor shaft of the fan motor 122.

In addition, a fan shroud 125 of the cooling fan 120 is installed on the mounting member 114 to be disposed outside the blade 121. That is, in the state in which the cooling fan 120 is disposed behind the radiator 110, the fan shroud 125 is coupled and fixed to the mounting member 114 to be mounted.

As such, in an embodiment of the present disclosure, the cooling module 100 is installed so as to be supported by the left and right vehicle body frames 4 and the cross members 6 connecting between the left and right vehicle body frames 4, and the cross members 6 are disposed to cross the lower space in the form of a straight line in the lateral direction even behind the cooling fan 120 as illustrated in FIGS. 12 and 13. In this case, a length of the cross member 6 may be smaller than the left and right widths of the cooling fan 120.

In FIGS. 12 and 13, the flow direction of the air after passing through the cooling fan 120, that is, the flow direction of the fan wake air is indicated by arrows. As illustrated in the drawings, when the cooling fan 120 is driven, the air passing through the cooling fan flows so as to be obliquely deflected in the outward direction of the cooling fan, rather than flowing straight to the rear or gathered in the center.

In this case, in order not to interfere with the outward flow of the fan wake air, the cross member 6 is installed at a position higher than the height of the lower end (lowest end of the ring part) of the blade 121 of the cooling fan 120 so that the cross member 6 is positioned inside the outward direction from which the air is discharged. Accordingly, the cross member 6 has a structure in which the cooling fan 120 is disposed to cross the rear of the blade 121 from left to right rather than the lower side of the blade 121.

In this way, in an embodiment of the present disclosure, since the cross member 6 does not act as resistance, it is possible to greatly improve the fan wake resistance and increase the amount of air passing through the radiator 110 and the cooling fan 120. In addition, it is possible to prevent the hot air passing through the radiator 110 and the cooling fan 120 from flowing back and being re-introduced into the radiator, and increase the cooling performance in the radiator.

Figure 14:
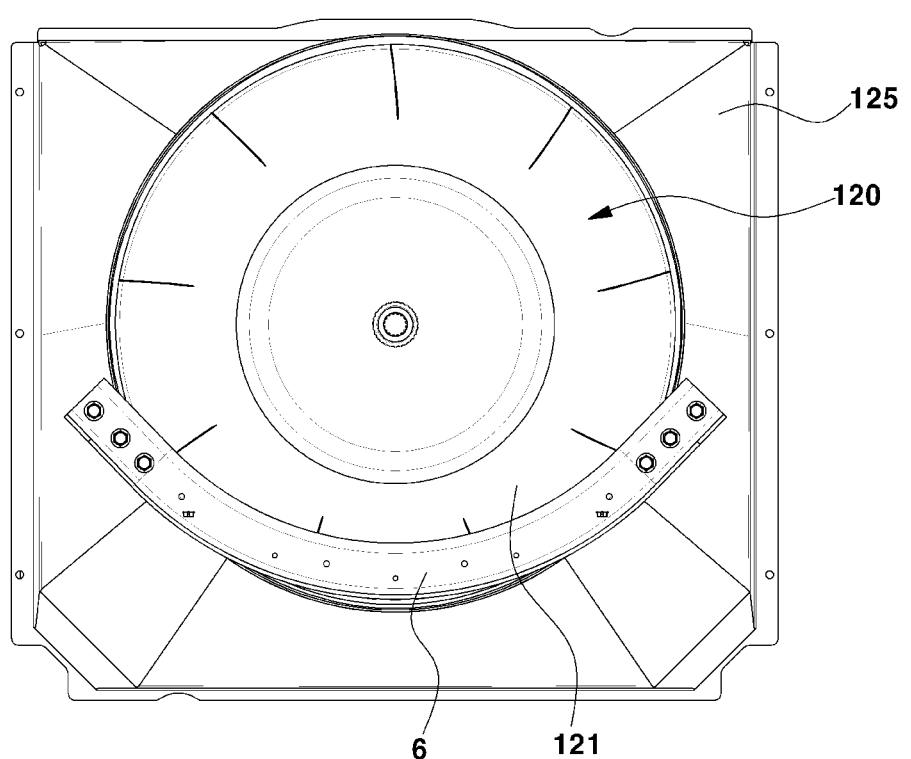
FIG. 14 is a reference diagram illustrating a state in which a cross member is installed in a conventional vehicle.

FIG. 14 is a reference diagram illustrating the state in which the cross member 6 is installed in the conventional vehicle. As illustrated, in related art, the cross member 6 is disposed along the lower end (blade radius end) of the blade 121 of the cooling fan 120. In the disposition structure, the cross member 6 acts as a resistance body by interfering with the flow of air flowing downward from the end of the blade of the cooling fan 120.

On the other hand, in an embodiment of the present disclosure, as illustrated in FIG. 11, the position of the cross member 6 is raised, and as illustrated in FIGS. 12 and 13, the interval between the blade 121 of the cooling fan 120 and the cross member 6 is sufficiently secured. Accordingly, it is possible to greatly reduce the resistance of air flowing through the radiator 110 and the cooling fan 120.

When the cooling fan 120 is driven to rotate the blade 121, some of the air (fan wake air) blown backward through the blade 121 flows obliquely downward (arrow direction in FIG. 12).

In an embodiment of the present disclosure, since the cross member 6 is installed at a position higher than the end (lower end of the rotor blade) of the blade 121 of the cooling fan 120, the fan wake air blown backward through the blade 121 is hardly interfered with by the cross member 6, so the air flow resistance by the cross member 6 may be minimized.

Figure 15:
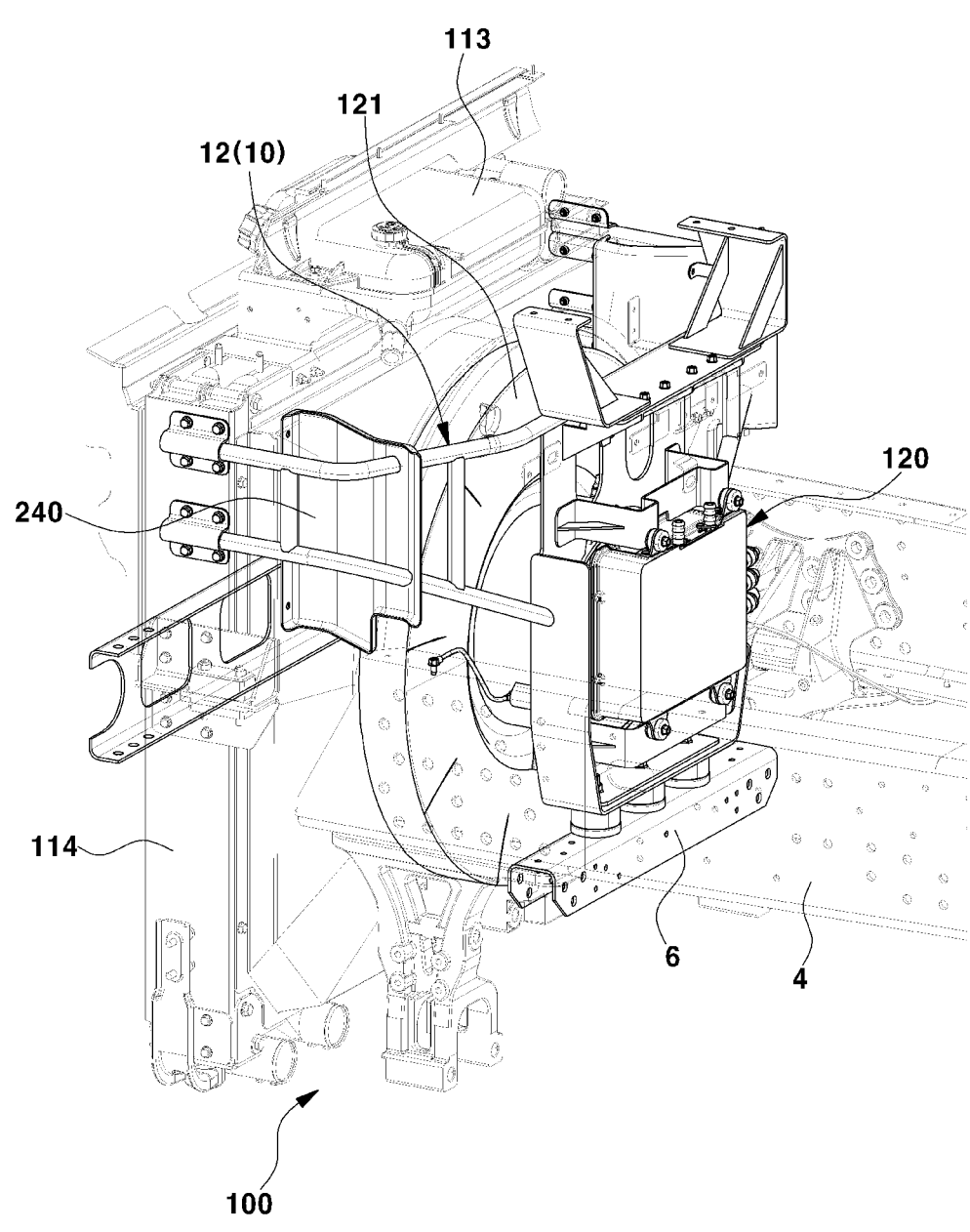
FIG. 15 is a perspective view illustrating an embodiment in which a side guide member is installed according to an embodiment of the present disclosure.
Figure 16:
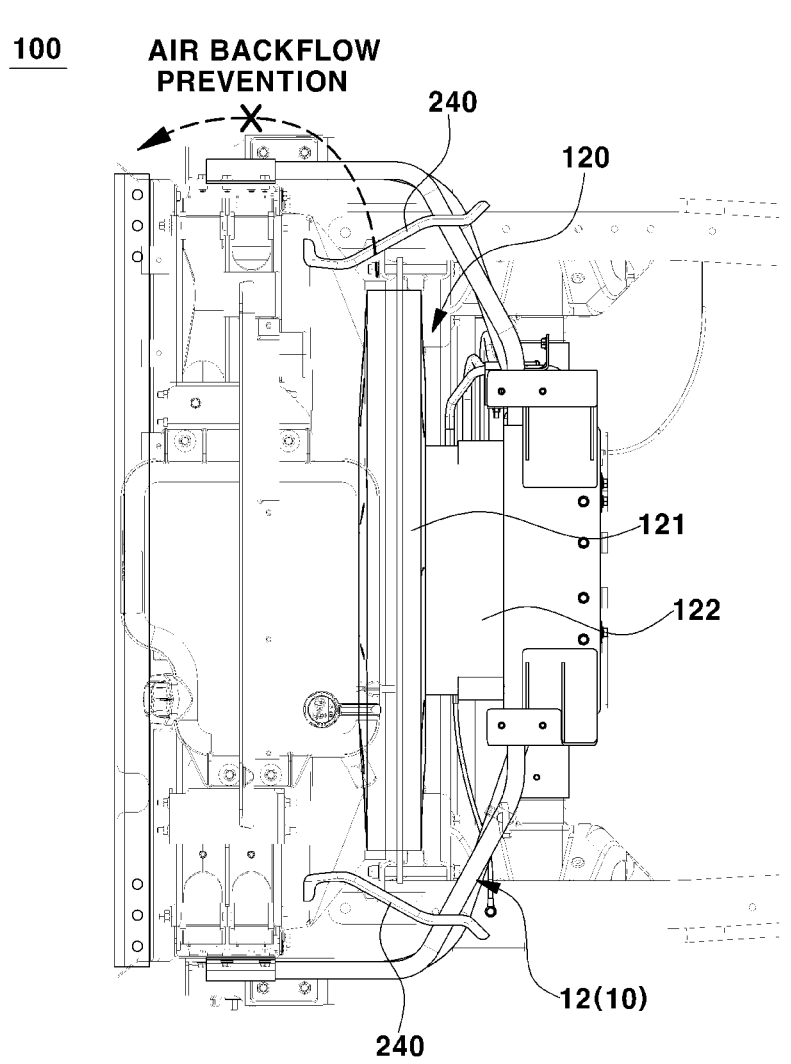
FIG. 16 is a plan view of an embodiment in which the side guide member is installed according to an embodiment of the present disclosure.

Meanwhile, FIG. 15 is a perspective view illustrating an embodiment in which a side guide member is installed according to an embodiment of the present disclosure, and FIG. 16 is a plan view of the embodiment in which the side guide member is installed. As illustrated, in the mounting member 114 to which the radiator (reference numeral "110" in FIG. 5) is fixed and coupled to the inside, the rod type bracket 12 in the fan mounting bracket (reference numeral "8" in FIG. 10), or the like, the side guide member 240 may be installed to be disposed on the left and right side surfaces of the upper portion of the cooling module 100.

The side guide member 240 may be disposed on the left and right sides of the cooling fan 120, respectively, which guides air discharged from the cooling fan 120 to the rear of the cooling fan to improve an air stream line and prevents the air passing through the cooling fan 120 from flowing back to the front of the radiator 110 of the cooling module 100 and being re-introduced to the front (prevents backflow and re-introduction of air).

Figure 17:
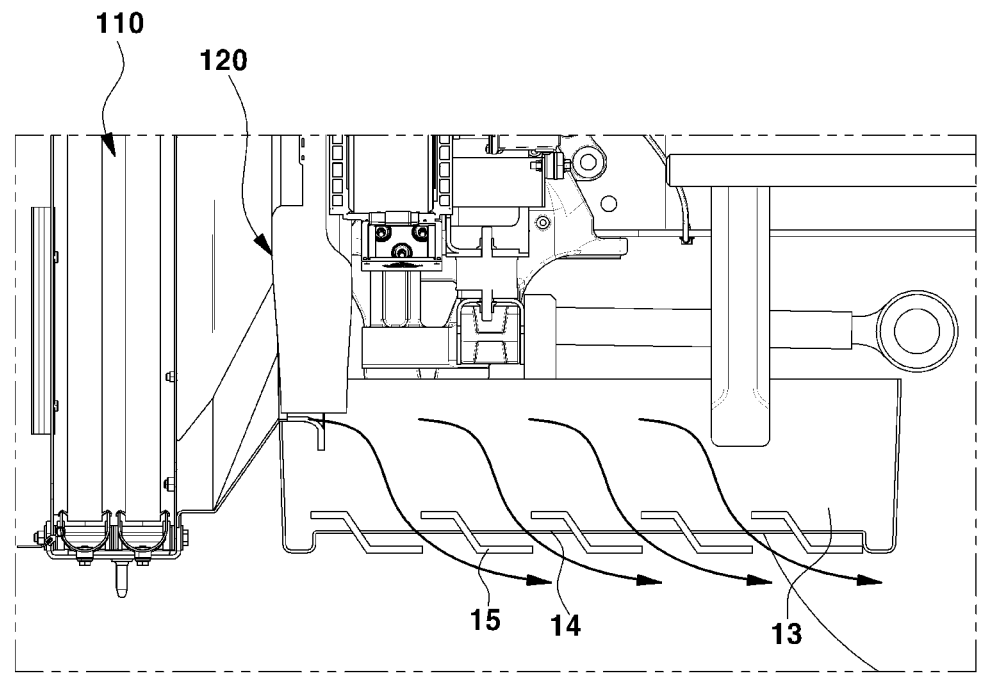
FIG. 17 is a diagram illustrating a state in which an undercover is installed under a rear side of the cooling fan in the front end portion of the vehicle body of the vehicle according to an embodiment of the present disclosure.
Figure 18:
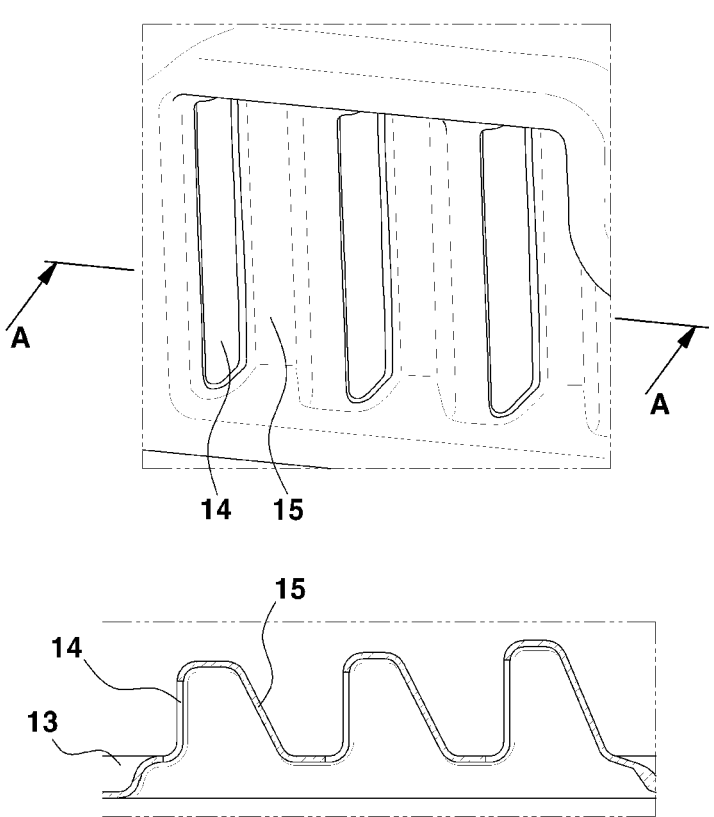
FIG. 18 is a cross-sectional view illustrating a shape of the undercover in an embodiment of the present disclosure.

Next, FIG. 17 is a diagram illustrating the state in which the undercover is installed in the lower portion of the rear side of the cooling fan in the front end portion of the vehicle body of the vehicle according to an embodiment of the present disclosure, and FIG. 18 is a cross-sectional view illustrating the shape of the undercover in an embodiment of the present disclosure.

As illustrated, the undercover 13 is installed behind the cooling fan 120 of the cooling module 100 so as to be positioned under the front end portion of the vehicle body, and the plurality of air passage holes 14 are formed in the undercover 13 through which air discharged from the cooling fan 120 passes downward.

The air passage hole 14 of the undercover 13 guides and passes through the air passing through the cooling fan 120 downward to minimize the air flow resistance behind the cooling fan and minimize the resistance action of the undercover 13.

In an embodiment of the present disclosure, the plurality of air passage holes 14 may be formed to be disposed at a predetermined interval in the front-rear direction of the vehicle. In this case, each air passage hole 14 may be formed in a slit shape extending long along the left-right direction of the vehicle.

In addition, in the undercover 13, the vanes 15 that guide the air discharged from the cooling fan 120 downward and backward are formed at positions of each air passage hole 14 in a downwardly protruding shape. In this case, the air passage hole 14 may be formed on the rear surface of each vane 15.

As a result, the air discharged downward from the cooling fan 120 passes through the undercover 13 downward and backward by the air passage hole 14 and the vane 15, so it is possible to minimize the air flow resistance.

Figure 19A:
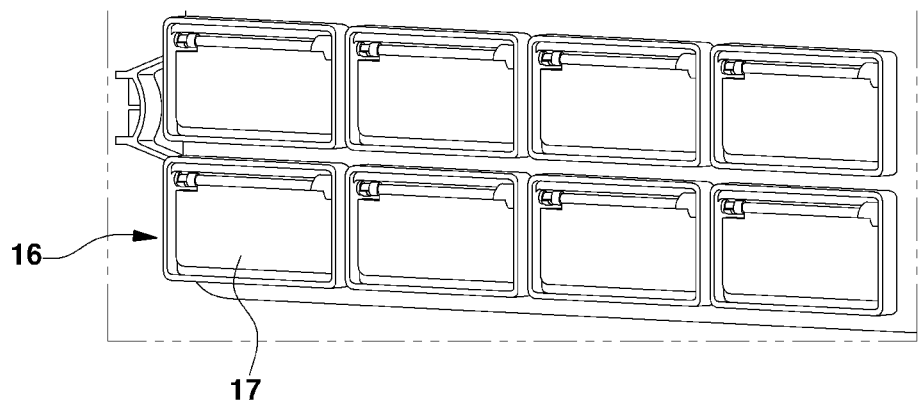
FIGS. 19A and 19B are perspective views illustrating an air flap device in the vehicle according to an embodiment of the present disclosure.
Figure 19B:
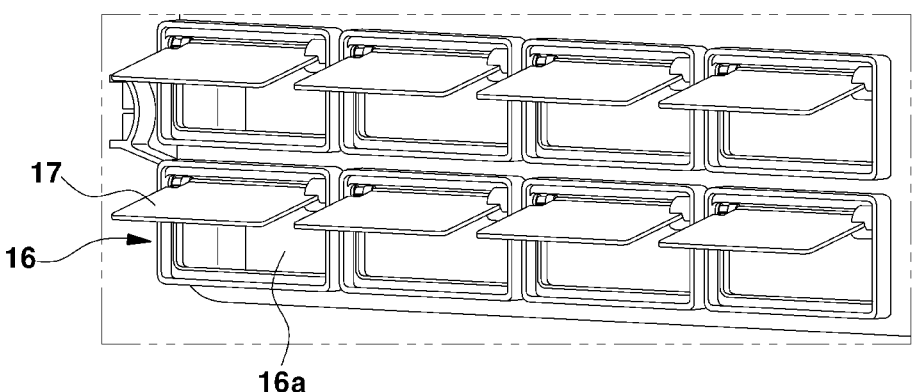

In an embodiment of the present disclosure, an active air flap device 16 as illustrated in FIGS. 19A and 19B may be installed on the lower side of the radiator grille 3 in the front panel 2 which becomes the front surface portion of the vehicle in the vehicle body of the front end portion of the vehicle body. FIG. 19A illustrates a closed state of the air flap device 16, and FIG. 19B illustrates an open state of the air flap device 16 so that air can be introduced through the opening of the front end portion of the vehicle body.

The air flap device 16 is installed in the front end portion of the vehicle body to selectively block the flow of air introduced through a separate opening (not illustrated) under the radiator grille. Referring to FIG. 12, the installation position of the air flap device 16 is illustrated, and the air flap device 16 selectively opens and closes the opening formed on the lower side of the vehicle body according to the driving state of the vehicle.

The air flap device 16 includes an actuator (not illustrated) whose driving is controlled by a controller (not illustrated), and a flap 17 that rotates by the actuator to open and close an air passage 16a.

The air flap device 16 opens and closes the opening formed in the front end portion of the vehicle body according to the vehicle speed so as to be positioned in front of the lower portion of the radiator 110. In this case, the controller selectively opens and closes the opening by the flap 17 by controlling the operation of the actuator based on the real-time vehicle speed information detected by a sensor.

Here, the opening is an air inlet provided in the front end portion of the vehicle body so that air may be introduced separately from the radiator grille 3 and may be formed to be positioned under the radiator grille in the front end portion of the vehicle body. The opening may be formed in a lower end portion of a bumper or a vehicle body part of a lower side of the bumper in the front end portion of the vehicle body.

In an embodiment of the present disclosure, the controller may output a control signal for closing the air flap device 16 when a vehicle speed is equal to or higher than the set vehicle speed when driving at a high speed and may output a control signal for opening the air flap device 16 while driving at a low speed when the vehicle speed is lower than the set vehicle speed.

Accordingly, while driving at high speed, the opening of the front end portion of the vehicle body and the air passage 16a of the air flap device 16 are closed by the controller, and while driving at low speed, the opening of the front end portion of the vehicle body and the air passage 16a of the air flap device 16 are opened by the controller.

When the air flap device 16 is open, the opening and the air passage of the front end portion of the vehicle body are in an open state. In this case, air may be introduced only through the opening and the air passage of the front end portion of the vehicle body, so it is possible to increase the inflow rate of air to the lower portion of the radiator 110.

In this way, embodiments of the present disclosure have been described in detail, and by the above configuration, it is possible to optimize the flow of air introduced through the radiator grille of the front end portion of the vehicle body and then passing through the radiator and the cooling fan of the cooling module.

In particular, it is possible to minimize the amount of air that bypasses without passing through the radiator in the front end portion of the vehicle body while maximizing the inflow rate of fresh air that passes through the radiator grille and then is directed to the radiator and to minimize the amount of air re-introduced into the radiator by passing through the radiator and the cooling fan and then flowing back forward. In addition, it is possible to minimize the air flow resistance in the front end portion of the vehicle body.

In addition, it is possible to delete the complex hydraulic components for driving the conventional hydraulic cooling fan, improve the cooling performance of the radiator, improve the stack outlet temperature, delete a separate auxiliary radiator due to the increase in the cooling performance of the radiator, and the like.

In addition, it is possible to delete the complex hydraulic components for driving the conventional hydraulic cooling fan, improve the cooling performance of the radiator, improve the stack outlet temperature, delete the separate auxiliary radiator due to the increase in the cooling performance of the radiator, and the like.

Hereinabove, although embodiments of the present disclosure have been described in detail hereinabove, the scope of the present disclosure is not limited thereto, but may include several modifications and alterations made by those skilled in the art using a basic concept of the present disclosure as defined in the claims.

What is claimed is:

1. A vehicle comprising:
   a vehicle body; and
   an air guide disposed in a space between a radiator grille and a cooling module in a front end portion of the vehicle body, the air guide being configured to guide air introduced through the radiator grille to flow to a radiator of the cooling module, wherein the air guide comprises:

a first guide member fixed to a grille side structure of a front surface portion of the vehicle in which the radiator grille is positioned in the front end portion of the vehicle body; and
   a second guide member installed in a cooling module side structure and spaced apart from the first guide member at an interval, wherein the cooling module side structure comprises a mounting member that fixes and mounts the radiator to a fixed vehicle body portion of the front end portion of the vehicle body while being coupled to the radiator.

2. The vehicle of claim 1, wherein the grille side structure comprises a front panel that is a front surface portion in a cab on which a driver rides, wherein the cab is a movable vehicle body part, and is configured to be tiltable in the vehicle body.

3. The vehicle of claim 2, wherein:
   the second guide member is installed to be disposed along an outer circumferential portion of the radiator while being coupled to the mounting member; and
   the first guide member is installed to an inner side surface of the front panel.

4. The vehicle of claim 3, wherein the first guide member and the second guide member are disposed to partially overlap each other in a front-rear direction of the vehicle or an up-down direction of the vehicle and are spaced apart from each other so as not to collide with each other even when the cab moves.

5. The vehicle of claim 1, wherein one of the first guide member and the second guide member is provided with a spacer configured to maintain the interval while preventing contact between the first and second guide members while being positioned between the first and second guide members.

6. The vehicle of claim 1, further comprising a cooling fan configured to suck air in the cooling module, the cooling fan comprising a motor direct-connected electric cooling fan in which a blade is directly connected to a rotor shaft of a fan motor.

7. The vehicle of claim 1, further comprising an undercover mounted on a lower end portion of the front end portion of the vehicle body at a rear of the cooling module, the undercover comprising a plurality of air passage holes provided therein so that air passing through the cooling module passes through the air passage holes.

8. The vehicle of claim 7, wherein the plurality of air passage holes are each spaced apart from each other at an interval in a front-rear direction of the vehicle, and each air passage hole has a slit shape extending long along a left-right direction of the vehicle.

9. The vehicle of claim 8, wherein, in the undercover, vanes for guiding the air passing through the cooling module downward and backward are provided at positions of each air passage hole in a shape protruding downward, and the air passage holes are provided on rear surfaces of each vane.

10. The vehicle of claim 1, wherein an air flap device configured to selectively block a flow of air introduced through an opening under the radiator grille is installed in the front end portion of the vehicle body.

11. The vehicle of claim 1, wherein a surge tank in which a coolant is stored is disposed above the radiator.

12. A vehicle comprising:
   a vehicle body;
   an air guide disposed in a space between a radiator grille and a cooling module in a front end portion of the vehicle body, the air guide being configured to guide air introduced through the radiator grille to flow to a radiator of the cooling module, wherein the air guide comprises:

a first guide member fixed to a grille side structure of a front surface portion of the vehicle in which the radiator grille is positioned in the front end portion of the vehicle body;

a second guide member installed in a cooling module side structure and spaced apart from the first guide member at an interval; and a cross member disposed to extend along a left-right direction of the vehicle from a rear of a blade of a cooling fan configured to suck air in the cooling module, the cross member being installed to be supported, via a fixed bracket, between two vehicle body frames on left and right sides disposed to extend long along a front-rear direction of the vehicle on left and right sides of the vehicle body, respectively.

13. The vehicle of claim 12, wherein the cross member is disposed to cross a rear space of the blade in the left-right direction of the vehicle at a position higher than a lower end of the blade of the cooling fan.

14. The vehicle of claim 12, wherein the cooling fan comprises a motor direct-connected electric cooling fan in which the blade is directly connected to a rotor shaft of a fan motor, and wherein the fan motor and an inverter of the cooling fan are installed to be supported by the cross member via a fan mounting bracket.

15. The vehicle of claim 14, wherein the fan mounting bracket is installed to be supported on an upper surface of the cross member with an insulator interposed therebetween.

16. The vehicle of claim 14, wherein the radiator is mounted on the two vehicle body frames on the left and right sides via a mounting member, and wherein the fan mounting bracket comprises:

a bracket body to which the fan motor and the inverter of the cooling fan are fixed and mounted; and a supporter installed to support the bracket body in the mounting member and the cross member.

17. The vehicle of claim 16, wherein the supporter comprises:

a frame coupled to the bracket body and installed to be supported with an insulator interposed on an upper surface of the cross member; and a rod type bracket in which a plurality of rods connecting between the mounting member and the frame are installed in a combined configuration to support the frame on the mounting member.

18. The vehicle of claim 16, wherein side guide members disposed on the left and right sides of the cooling fan are installed in the mounting member or the fan mounting bracket so that air passing through the cooling fan by the side guide members is guided to a rear of the cooling fan without flowing back to a front of the radiator.

19. A fuel cell electric vehicle equipped with a fuel cell stack, the vehicle comprising:

a vehicle body;

a radiator grille in a front end portion of the vehicle body;

a cooling module in the front end portion of the vehicle body, the cooling module comprising a radiator, wherein the radiator comprises:

a power electric (PE) component radiator configured to radiate heat of a coolant for a PE component that cools a driving motor for driving the vehicle, the PE component comprising an inverter for the driving motor; and a stack radiator configured to radiate heat of a coolant for a stack configured to cool the fuel cell stack; and an air guide disposed in a space between the radiator grille and the cooling module in the front end portion of the vehicle body, the air guide being configured to guide air introduced through the radiator grille to flow to the radiator of the cooling module, wherein the air guide comprises:

a first guide member fixed to a grille side structure of a front surface portion of the vehicle in which the radiator grille is positioned in the front end portion of the vehicle body; and a second guide member installed in a cooling module side structure and spaced apart from the first guide member at an interval.

20. The vehicle of claim 19, further comprising a surge tank in which a coolant is stored disposed above the radiator.

21. The vehicle of claim 20, wherein the surge tank comprises an integrated surge tank in which an inner space of a container is partitioned by a partition wall into a space in which the coolant for the PE component and the coolant for the stack are each stored.

* * * * *